United States Patent
Maruchi et al.

(10) Patent No.: US 7,649,656 B2
(45) Date of Patent: Jan. 19, 2010

(54) IMAGE READING DEVICE

(75) Inventors: Noritoshi Maruchi, Toyokawa (JP);
Hiroshi Nishikawa, Toyokawa (JP);
Kazuhiro Ishiguro, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 973 days.

(21) Appl. No.: 11/009,462

(22) Filed: Dec. 13, 2004

(65) Prior Publication Data
US 2006/0061836 A1    Mar. 23, 2006

(30) Foreign Application Priority Data
Sep. 17, 2004    (JP) .............. 2004-271962

(51) Int. Cl.
H04N 1/46    (2006.01)
G06F 15/00    (2006.01)

(52) U.S. Cl. .............. 358/505; 358/1.9; 358/533

(58) Field of Classification Search .......... 358/1.9, 358/505, 506, 514, 515, 518, 533, 296, 483, 358/488, 496, 497, 520; 382/167, 274, 275
See application file for complete search history.

(56) References Cited

U.S. PATENT DOCUMENTS

| | | | | |
|---|---|---|---|---|
| 5,923,042 | A * | 7/1999 | Mietta et al. .......... | 250/559.06 |
| 6,766,046 | B1 * | 7/2004 | Saito et al. .......... | 382/141 |
| 7,072,075 | B2 * | 7/2006 | Kondo et al. .......... | 358/1.9 |
| 7,327,497 | B2 * | 2/2008 | Sugeta et al. .......... | 358/461 |
| 2001/0026380 | A1 | 10/2001 | Imoto | |
| 2004/0057616 | A1 * | 3/2004 | Kondo et al. .......... | 382/167 |
| 2004/0223192 | A1 * | 11/2004 | Hiromatsu et al. .......... | 358/474 |
| 2005/0068614 | A1 * | 3/2005 | Yoneyama et al. .......... | 359/368 |
| 2005/0122508 | A1 * | 6/2005 | Uto et al. .......... | 356/237.2 |
| 2005/0179954 | A1 * | 8/2005 | Arai et al. .......... | 358/3.26 |
| 2005/0206968 | A1 * | 9/2005 | Sodeura et al. .......... | 358/474 |
| 2005/0254097 | A1 * | 11/2005 | Schweid et al. .......... | 358/3.26 |
| 2005/0275909 | A1 * | 12/2005 | Takayama et al. .......... | 358/509 |

FOREIGN PATENT DOCUMENTS

| | | |
|---|---|---|
| JP | 2001-272829 A | 10/2001 |
| JP | 2002-271631 | 9/2002 |
| JP | 2002-354262 A | 12/2002 |
| JP | 2004-112611 A | 4/2004 |

* cited by examiner

Primary Examiner—Madeleine A Nguyen
(74) Attorney, Agent, or Firm—Morrison & Foerster LLP

(57) ABSTRACT

An image reading device capable of detecting foreign particles on a transparent member by including the transparent member, a conveyance unit that conveys an original document to the transparent member, a reading unit that reads via the transparent member an image of the original document being conveyed on the transparent member at multiple reading positions that exist with a prescribed distance therebetween along an original document conveyance direction, an output unit that outputs signals for different color components corresponding to each of the reading positions, a transparent member moving unit that moves the transparent member in a prescribed direction such that the original document slides over the transparent member while being conveyed to the reading positions during image reading, and a detector that detects noise components caused by foreign particles on the transparent member based on the output signals from the output unit.

12 Claims, 14 Drawing Sheets

Fig.8

| TIME | POSITION B | POSITION G | POSITION R |
|---|---|---|---|
| T0 | $(N-8)^{TH}$ LINE | $(N-4)^{TH}$ LINE | $N^{TH}$ LINE |
| T1 | $(N-7)^{TH}$ LINE | $(N-3)^{TH}$ LINE | $(N+1)^{TH}$ LINE |
| ... | ... | ... | ... |
| T4 | $(N-4)^{TH}$ LINE | $N^{TH}$ LINE | $(N+4)^{TH}$ LINE |
| ... | ... | ... | ... |
| T8 | $N^{TH}$ LINE | $(N+4)^{TH}$ LINE | $(N+8)^{TH}$ LINE |
| ... | ... | ... | ... |
| T32 | $(N+24)^{TH}$ LINE | $(N+28)^{TH}$ LINE | $(N+32)^{TH}$ LINE |
| ... | ... | ... | ... |
| T64 | $(N+56)^{TH}$ LINE | $(N+60)^{TH}$ LINE | $(N+64)^{TH}$ LINE |
| ... | ... | ... | ... |

IMAGE READING DEVICE

This application is based on Japanese Patent Application No. 2004-271962 filed in Japan on Sep. 17, 2004, the entire content of which is hereby incorporated by reference.

BACKGROUND OF THE INVENTION

1. Field of the Invention

The present invention relates to an image reading device that reads an original document image via a transparent member by moving the original document relative to the transparent member, and more particularly to an improvement of the technology to detect foreign particles on the transparent member.

2. Description of the Related Art

Image reading devices used in copying machines, for example, can be roughly divided, based on the reading method used, into (i) those using the so-called sheet-through method in which an image reading unit including a CCD sensor or the like is fixed at the original document reading area of the platen glass (i.e., the transparent member) and the image of the original document is read by moving the original document in the secondary scanning direction at a prescribed speed using an automatic original document feeder, and (ii) those using the so-called scanner movement method in which the original document image is read by moving the image reading unit while the original document is fixed in place.

The scanner movement method requires space and a mechanism for the movement of the image reading unit because the image reading unit is moved over the full length of the original document in the secondary scanning direction, while the sheet-through method offers the advantage that the space, etc. required for movement of the image reading unit is not required, enabling the device to be made smaller and less expensive in comparison with the scanner movement method.

However, in the case of the sheet-through method, if a foreign particle is present at the original document reading area on the platen glass due to introduction of dust, the foreign particle is read at all times during original document reading, even if it comprises only a small dot, which leads to the same result as when the original document is soiled from one end to the other in a linear fashion, resulting in continuous linear noise running in the secondary scanning direction in the image reproduced from the image data obtained by reading the original document.

Accordingly, Japanese Patent Laid-Open No. 2002-271631 discloses an image reading device based on the sheet-through method that reads the color image for each pixel, in which a reading CCD sensor to read the color components of R (red), G (green) and B (blue) and a foreign particle detection CCD sensor to detect foreign particles on the platen glass are disposed along the secondary scanning direction with a prescribed distance therebetween, the image information (i.e., the density value data) output from the reading CCD sensor and the image information output from the foreign particle detection CCD sensor are compared for each pixel, foreign particles on the platen glass are detected from the comparison results, and correction is made accordingly.

More specifically, focusing on one pixel of the original document image, if there are no foreign particles on the platen glass, the image information output regarding this pixel by the respective CCD sensors should be essentially identical. However, if a foreign particle resides on a part of the platen glass that constitutes a part of the light path to the reading CCD sensor, the image information from the reading CCD sensor that is affected by the foreign particle and the image information from the foreign particle detection CCD sensor that is not affected by the foreign particle are conspicuously different from each other, and where there is such a difference, the foreign particle on the glass is detected. When a foreign particle is detected, correction is made to the image information for the pixel that is affected by the foreign particle such that the foreign particle does not appear in the image as noise.

However, according to the image reading device disclosed in Japanese Patent Laid-Open No. 2002-271631, a CCD sensor must be included in the device for the detection of foreign particles, in addition to the CCD sensor for reading. Furthermore, if dust, for example, adheres to parts of the platen glass within the light paths of both CCD sensors, no conspicuous difference arises between the image information output by the reading CCD sensor and the image output by the foreign particle detection CCD sensor, making detection of foreign particles impossible.

OBJECTS AND SUMMARY

An object of the present invention is to provide a sheet through-type image reading device that reads color images and resolves the problem described above, wherein foreign particles on the transparent member such as the platen glass due to adherence of dust or the like can be detected with improved accuracy without the need to include in the device an additional sensor separate from the reading sensor.

This and other objects are achieved by proving an image reading device including: a transparent member, a conveyance unit that conveys an original document to the transparent member, a reading unit that reads via the transparent member an image of the original document being conveyed on the transparent member at multiple reading positions that exist with a prescribed distance therebetween along an original document conveyance direction, an output unit that outputs signals for different color components corresponding to each of the reading positions, a transparent member moving unit that moves the transparent member in a prescribed direction such that the original document slides over the transparent member while being conveyed to the reading positions during image reading, and a detector that detects noise components caused by foreign particles on the transparent member based on the output signals from the output unit.

The reading unit reads the image of the original document on pixel-by-pixel basis and the detector detects whether or not an edge component is included in a color component signal for each pixel and detects the existence of noise components based on the detection results.

Furthermore, when the number of multiple positions is 'n' and the number of different colors is 'n'('n' being an integer that equals or exceeds 2), and when the color component signals for the target pixel and (n−1) reference pixels located within prescribed distances from the target pixel along the secondary scanning direction are analyzed in sequence starting with the target pixel, if the sequence of colors including an edge component matches the sequence of colors corresponding to the reading positions along the direction of movement of the transparent member, said detector determines that a noise component is included in each pixel's color component signal including an edge component.

The prescribed direction is a direction opposite the direction of movement of the original document on the transparent member.

Furthermore, when the distance between adjacent reading positions along the secondary scanning direction is L, the original document conveyance speed is V and the period of time required by the transparent member to move the distance L is T, the prescribed distance is an inter-pixel distance equivalent to the distance (V*T+L).

The reading unit reads the image of the original document on pixel-by-pixel basis, and the detector detects a noise component when the gradation difference between the target pixel and its surrounding pixels equals or exceeds a prescribed value for each pixel.

The prescribed direction is the same direction as the direction of movement of the original document on the transparent member, and said transparent member moving unit moves the transparent member at a slower speed than the speed of movement of the original document.

When the distance between adjacent reading positions along the secondary scanning direction is L, the original document conveyance speed is V and the period of time required by the transparent member to move the distance L is T, the prescribed distance is an inter-pixel distance equivalent to the distance(V*T).

Moreover, the reading unit reads the original document image at first, second and third reading positions and said output unit outputs a red component signal for the first reading position, a green component signal for the second reading position, and a blue component signal for third reading position.

As a result, even if a foreign particle is adhering to the transparent member, such foreign particle does not remain at any one reading position, and where the original document image is read on a pixel-by-pixel basis, the color components of the foreign particle are distributed to and included in the read values for pixels that are separate from each other along the secondary scanning direction by prescribed distances, enabling detection of the noise components of the foreign particle according to the pattern in which the foreign particle color components appear based on such distribution. Therefore, unlike the conventional art in which detection of foreign particles adhering to the reading area on the transparent member is impossible due to the construction in which the transparent member does not move, more accurate noise detection can be achieved without the need to include a separate reading unit.

BRIEF DESCRIPTION OF THE DRAWINGS

These and other objects and features of the present invention will become clear from the following description taken in conjunction with the preferred embodiments thereof with reference to the accompanying drawings, in which:

FIG. 8 is a drawing showing the passage of an original document over the original document reading area 501 in a time-series fashion in connection with FIGS. 7(a)-7(e);

DETAILED DESCRIPTION OF THE PREFERRED EMBODIMENTS

Embodiments of the image reading device pertaining to the present invention are described below using an example in which such device is applied in the image reader of a digital color copying machine.

First Embodiment

Figure 1:
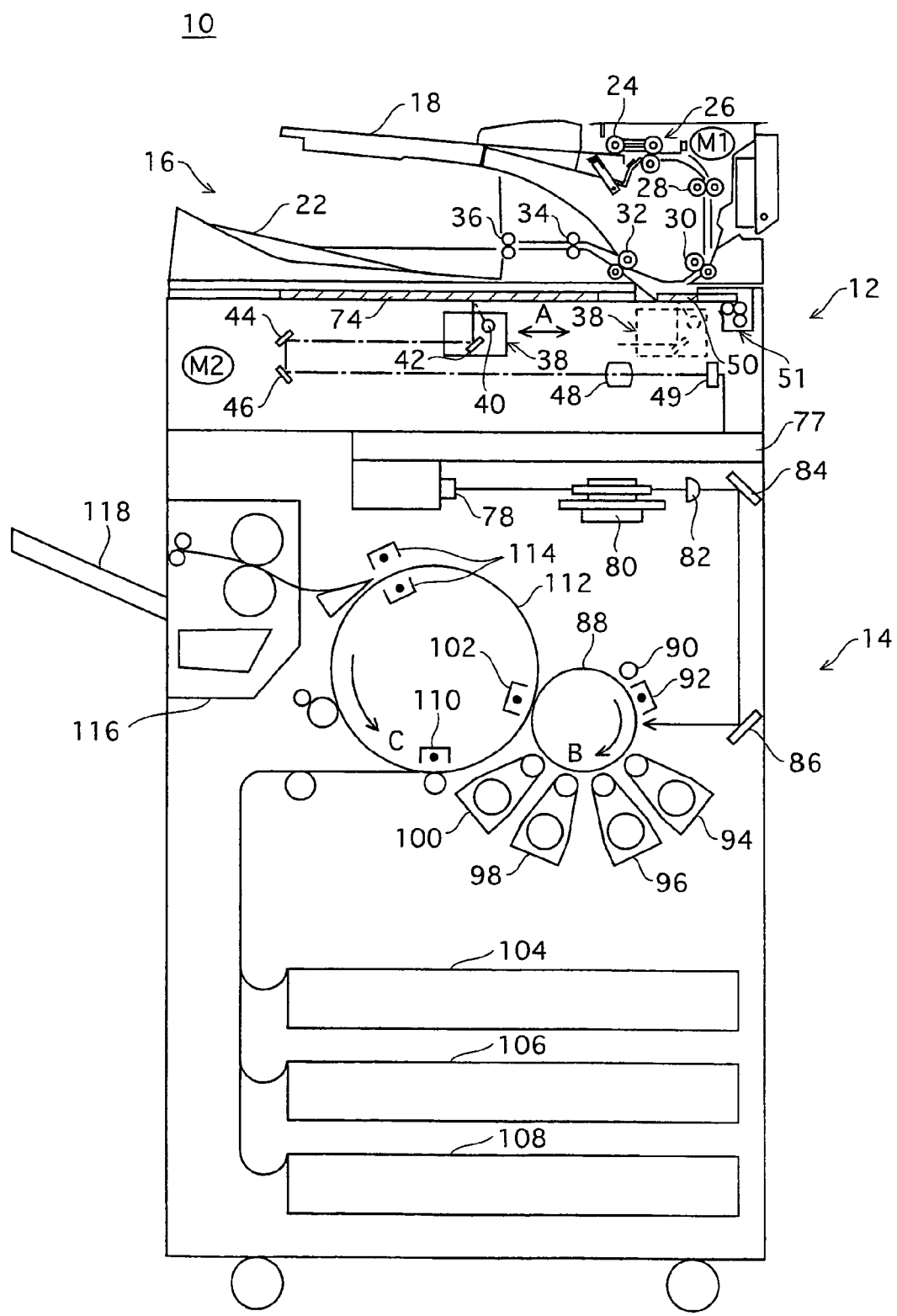
FIG. 1 is a drawing showing the basic construction of a digital color copying machine 10 of a first embodiment.

FIG. 1 is a drawing showing the basic construction of a digital color copying machine (hereinafter simply 'copier') 10.

As shown in FIG. 1, the copier 10 roughly comprises an image reader 12 that reads an original document image and a printer 14 that reproduces the read image by printing it on a recording sheet.

The image reader 12 is constructed such that it can read the original document image using the sheet-through method, which is a fixed optical system approach, and the scanner movement method, which is a moving optical system approach. The sheet-through method is an image reading method in which the optical system is stationary (i.e., fixed in place) while the original document is moved. The scanner movement method is an image reading method in which the original document remains stationary while a mirror that leads the reflected light from the original document surface to the CCD sensor is moved relative to the original document, such that the light path from the reading area to the CCD sensor is maintained at a constant length.

The image reader 12 includes an automatic original document feeder 16 to realize the sheet-through method.

The automatic original document feeder 16 separates each page of an original document placed on the original document supply tray 18, causes it to pass over the sheet-through platen glass (hereinafter simply 'platen glass') 50 and ejects it to an original document eject tray 22.

The top page of the original document placed on the original document supply tray 18 is separated from the rest of the original document by a pickup roller 24 and a separation roller 26, and is conveyed to a resist roller 30 via a first intermediate roller 28. The skew of the original document page is corrected here and the page is conveyed to the platen glass 50 by the resist roller 30. After passing over the platen glass 50, the original document page is further conveyed to an eject roller 36 by a second intermediate roller 32 and a third intermediate roller 34, and is ejected to the original document eject tray 22 by the eject roller 36. These rollers mentioned above are driven by an original document motor MI and are driven to rotate via a power transmission mechanism not shown.

The platen glass 50 is held by a glass driving unit 51.

Figure 2:
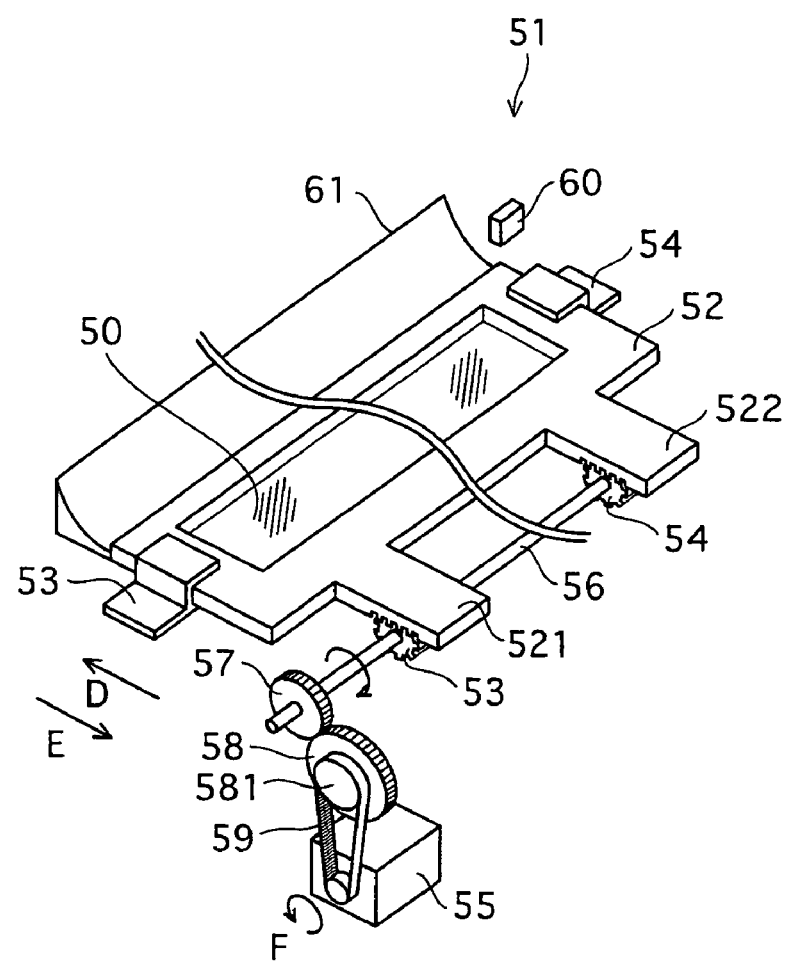
FIG. 2 is a perspective view showing the construction of the glass driving unit 51 of the copying machine 10.

FIG. 2 is a perspective view showing the construction of the glass driving unit 51.

As shown in the drawing, the glass driving unit 51 has a function to move the platen glass 50 in the direction of original document conveyance (the arrow D direction) and the direction opposite therefrom (the arrow E direction), and includes a glass holder 52, guides 53, 54, a motor 55, a rotational shaft 56, gears 57, 58, a belt 59, a home sensor 60 and a guide plate 61.

The glass holder 52 supports the platen glass 50, and racks 521, 522 are disposed along its upstream edge in terms of the direction of original document conveyance. The gears 53, 54 engage with the racks 521, 522, and the gears 53, 54 are secured to the rotational shaft 56.

The rotational shaft 56 is rotatably supported by a bearing member not shown, and the gear 57 is secured to one end thereof. The gear 57 engages with the gear 58.

The gear 58 is integrally formed with a pulley 581 that provides tension to the belt 59, and is rotatably supported by a shaft member not shown.

The belt 59 is suspended over the pulley 581 and the rotational shaft of the motor 55.

The motor 55 comprises a stepping motor, and is driven to rotate by the controller 77 (see FIG. 1). When the rotational shaft of the motor 55 rotates in the direction of the arrow F, the rotational driving power is sequentially transmitted to the belt 59; the gears 58, 57, the shaft 56 and the gears 53, 54, whereupon the glass holder 52 (and therefore the platen glass 50) moves in the direction of the arrow E. Conversely, where the rotational shaft of the motor 55 rotates in the direction opposite the arrow F direction, the glass holder 52 moves in the arrow D direction.

The guides 53, 54 movably support the glass holder 52 such that it can move in the arrow D direction or the arrow E direction. The guide plate 61 guides the original document page passing over the platen glass 50 to the original document eject tray 22.

The home sensor 60 is a reflective photoelectric sensor having light emitting elements and light receiving elements, and detects whether or not the glass holder 52 is at the home position (the position shown in FIG. 2). Specifically, when the light emitted from the light emitting elements is reflected by an edge of the glass holder 52 and the reflected light is detected by the light receiving elements, the home sensor 60 deems the glass holder 52 to be at the home position. If no reflected light is detected, the home sensor 60 deems the glass holder 52 to have moved in the arrow E direction separated from the home position. The home sensor 60 then accordingly sends a detection signal to the controller 77. The glass holder 52 (the platen glass 50) is controlled by the controller 77 to move in the arrow E direction (the direction opposite the direction of original document conveyance) during the reading of the original document image for the purpose of more accurately detecting foreign particles such as dust adhering to the platen glass 50. The details of this detection process is described below.

Returning to FIG. 1, where the original document is read using the sheet-through method, the scanner 38 is moved to the position indicated by a broken line (the sheet-through position) below the platen glass 50. Light is emitted from the lamp 40 of the scanner 38 to the original document passing over the platen glass 50, the scanner 38 being stationary at the sheet-through position. The light path of the light reflected from the original document surface is changed by a first mirror 42, a second mirror 44 and a third mirror 46, and forms an image on the light receiving surface of the CCD sensor 49 via a condenser lens 48.

Figure 3A:
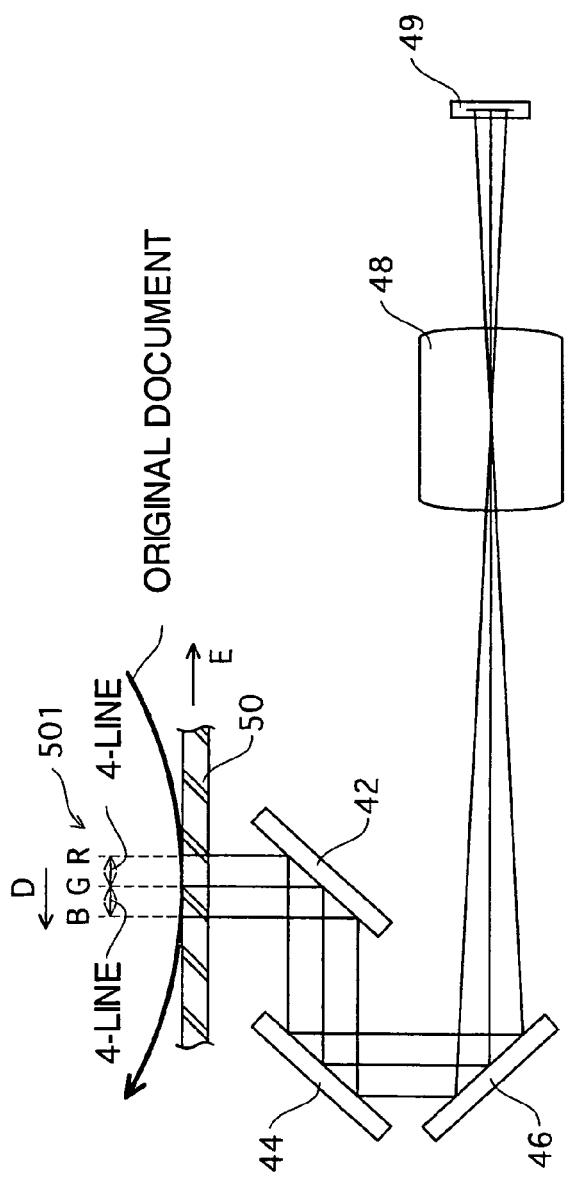
FIG. 3(a) is an enlarged view showing the optical path of the reflected light from the original document surface to the CCD sensor 49 in the sheet-through method.
Figure 3B:
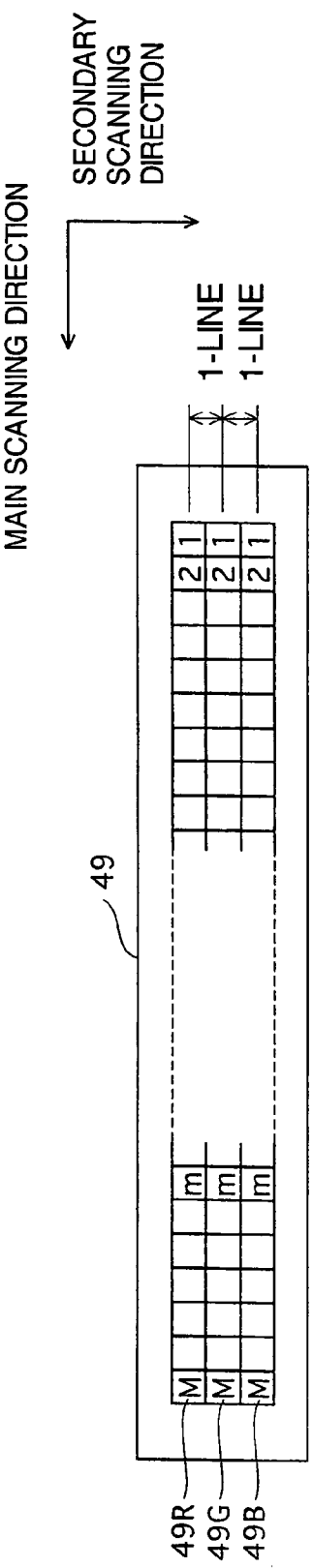
FIG. 3(b) is a drawing showing the light receiving surface of the CCD sensor 49.

FIG. 3(a) is an enlarged view showing the light path of the reflected light from the original document surface to the CCD sensor 49 in the sheet-through method, while FIG. 3(b) is a drawing showing the light receiving surface of the CCD sensor 49. The CCD sensor 49 functions as a reader to read the original document image, and as shown in FIG. 3(b), is a scaled-down three-line CCD sensor including three CCD line sensors 49R, 49G, 49B.

The CCD line sensor 49R is a sensor to read the red (R) component of the original document image, the CCD line sensor 49G is a sensor to read the green (G) component, and the CCD line sensor 49B is a sensor to read the blue (B) component. The CCD line sensors 49R, 49G, 49B each comprise a row of light receiving elements (one element corresponds to one pixel) comprising a number M of photodiodes, for example, aligned in the main scanning direction, that are aligned in the secondary scanning direction in the order of 49R, 49G and 49B with a one-line gap (approximately 42 μm here) in between.

The condenser lens 48, CCD sensor 49 and other components are disposed such that the reflected light at the position R of the original document reading area 501 shown in FIG. 3(a) strikes the CCD line sensor 49R, the reflected light at the position G strikes the CCD line sensor 49G and the reflected light at the position B strikes the CCD line sensor 49B. In that sense, it can be said that the position R is a reading position for reading the R component of the original document image, the position G is a reading position for reading the G component, and the position B is a reading position for reading the B component. In this embodiment, the positions R, G and B are separated from each other such that there is a distance equivalent to four lines (approximately 168 μm here) along the direction of original document conveyance (the arrow D direction, equivalent to the secondary scanning direction) between the position R and the position G as well as between the position G and the position B.

Returning to FIG. 1, separate from the platen glass 50, an original document manual placement glass 74 is disposed at a position that faces the automatic original document feeder 16.

As described above, where the original document is read using the sheet-through scan method, the scanner 38 is moved to the sheet-through position indicated by a broken line below the platen glass 50, emits light toward the original document conveyed from the automatic original document feeder 16 from that position and reads the original document image.

On the other hand, where reading is carried out when the original document is placed on the manual placement glass 74, the automatic original document feeder 16 is opened upward and the original document is placed on the manual placement glass 74. In this case, the scanner 38 is moved in the arrow A direction in FIG. 1. When this is done, the second mirror 44 and third mirror 46 move together in the same direction as the scanner 38 described above at one-half the speed of the scanner's movement, and as a result, the distance (the length of the light path) from the original document surface to the condenser lens 48 is maintained constant at all times, such that the reflected light from the original document forms an image on the light receiving surface of the CCD sensor 49. The scanner 38, second mirror 44 and third mirror 46 are driven to move by a scan motor M2 via a power transmission mechanism not shown.

When the reflected light from the original document is received, the CCD sensor 49 performs photoelectric conversion thereof into an R component image signal (data R) via the CCD line sensor 49R, into a G component image signal (data G) via the CCD line sensor 49G and into a B component image signal (data B) via the CCD line sensor 49B, and sends these signals to the controller 77. Specifically, each of the CCD lines sensors 49R-49B is driven by a timing signal based on a prescribed clock, and outputs the charge accumulated in the M light receiving elements each line cycle (the cycle to read the image of one line along the main scanning direction) as analog image signals for the pixels of the one line along the main scanning direction. As a result, an image for one line is read at each of the positions R, G and B, and therefore an image for three lines is simultaneously read. This operation is repeatedly executed in one-line cycles, leading to reading of the image of the entire one page of the original document.

The controller 77 detects whether or not the received data is affected by foreign particles such as dust adhering to the platen glass 50, and if it is detected that the data is affected by foreign particles, the controller 77 performs correction such that the foreign particles do not appear in the output image as noise. The controller 77 then generates laser diode driving signals based on the corrected data and causes the laser diode 78 to emit light.

The laser light emitted from the laser diode 78 is deflected by a polygon mirror 80 and passes through an fθ lens 82. The light path of the laser light is then changed by return mirrors 84, 86, and the laser light scans and exposes the surface of the photoreceptor drum 88 (the photosensitive surface) rotating in the arrow B direction.

An eraser lamp 90, a charger 92, toner developing devices 94, 96, 98, 100—one for each reproduction color, i.e., cyan (C), magenta (M), yellow (Y) and black (K)—and a transfer charger 102 are disposed around the photoreceptor drum 88. Before being scanned and exposed by the laser light, the photoreceptor drum 88 is neutralized by the irradiation by the eraser lamp 90, and then becomes uniformly charged by the charger 92. When the uniformly charged photosensitive surface is exposed by the laser light, an electrostatic latent image is formed. The electrostatic latent image is then developed into a toner image by one of the toner developing devices.

At the same time, a recording sheet of the desired size is supplied from one of the paper supply cassettes 104, 106, 108, and the supplied recording sheet wraps itself around (or adheres to) the transfer drum 112 rotating in the arrow C direction based on the operation of the electrostatic adsorption charger 110 and is conveyed to the transfer position facing the transfer charger 102. The toner image on the photoreceptor drum 88 is then transferred to the recording sheet based on the electrostatic operation of the transfer charger 102.

The exposure-transfer process described above is repeated for each color, i.e., cyan, magenta, yellow and black, with the same recording sheet, whereby the toner images of the various colors are superimposed onto each other to form a multicolor image.

The recording sheet on which the toner images of the four colors have been transferred is released from its adsorption onto the transfer drum 112 by the separating neutralizing changer 114 and separates from the transfer drum 112. After the toner images are fused to the recording sheet by the fusing device 116, the recording sheet is ejected to the tray 118.

The copier 10 includes an operation panel 120 (see FIG. 4) disposed on the top surface thereof at an easy-to-operate location. Keys such as a numeric keypad to enter the number of copies to print and a start key to start a copying operation (i.e., an operation to read and print the original document image), and a liquid crystal display on which to display buttons by which to receive selection input regarding the copy parameters and copy mode, as well as messages when paper runs out or becomes jammed, are disposed on the operation panel 120.

Figure 4:
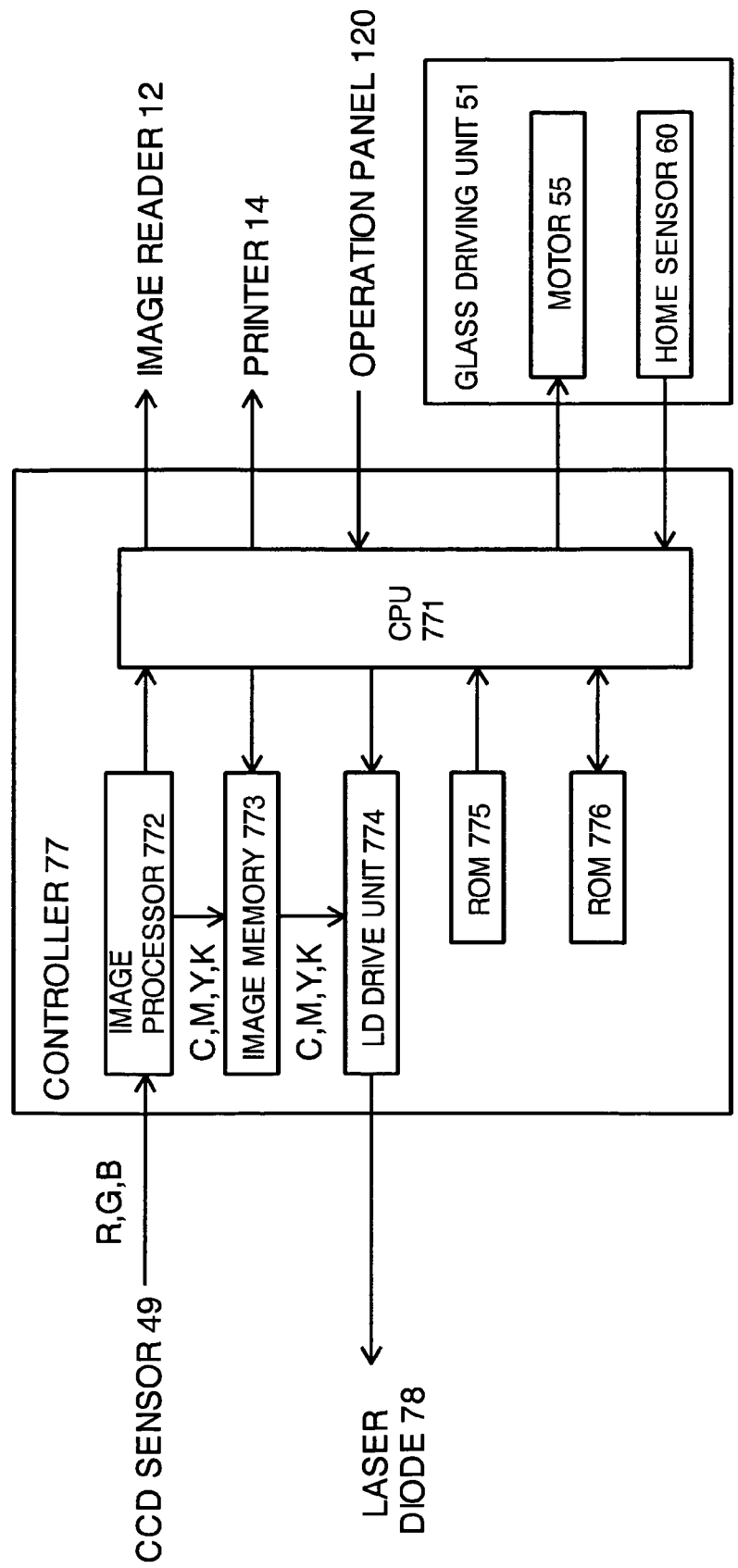
FIG. 4 is a block diagram showing the construction of the controller 77 of the copying machine 10.

FIG. 4 is a block diagram showing the construction of the controller 77.

As shown in the drawing, the controller 77 includes as main components a CPU 771, an image processor 772, an image memory 773, an LD drive unit 774, a ROM 775 that stores programs necessary for the control of the various components, and a RAM 776 that serves as a work area during execution of a program.

Figure 5:
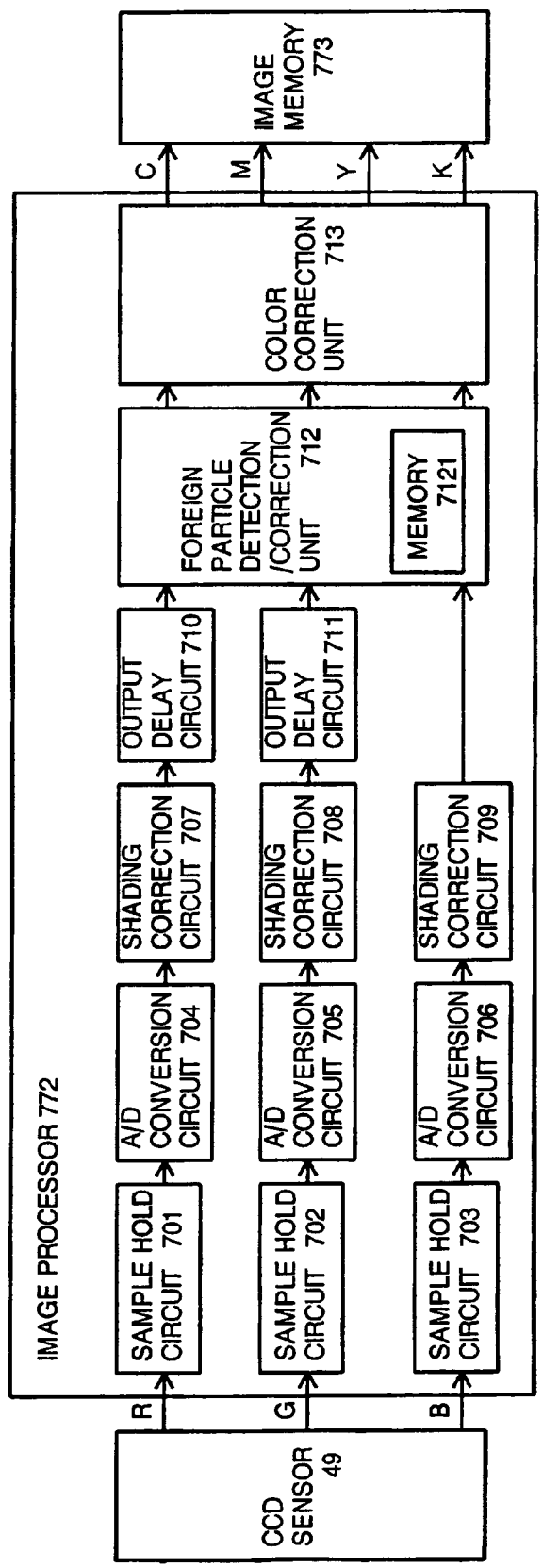
FIG. 5 is a block diagram showing the construction of the image processor 772 of the controller 77.

The image processor 772 includes as main components sample hold circuits 701, 702, 703, A/D conversion circuits 704, 705, 706, shading correction circuits 707, 708, 709, output delay circuits 710, 711, a foreign particle detection/correction unit 712 and a color correction unit 713, as shown in FIG. 5.

The sample hold circuit 701 samples data R from the CCD line sensor 49R at prescribed intervals and send it to the A/D conversion circuit 704.

The A/D conversion circuit 704 amplifies the data R from the sample hold circuit 701 to an appropriate level, converts the data into digital data and sends it to the shading correction circuit 707.

The shading correction circuit 707 receives the digital data from the A/D conversion circuit 704, performs public-domain shading correction, e.g., processing to correct for variation in the sensitivity of the CCD line sensor 49R and variation in light amount due to the characteristics of the optical system, and sends the corrected data to the output delay circuit 710.

The sample hold circuit 702, A/D conversion circuit 705 and shading correction circuit 708 perform sample hold, A/D conversion and shading correction, respectively, to the data G from the CCD line sensor 49G, and the sample hold circuit 703, A/D conversion circuit 706 and shading correction circuit 709 perform sample hold, A/D conversion and shading correction, respectively, to the data B from the CCD line sensor 49B using the same methods as for the data R.

The output delay circuit 710 sends the data R from the shading correction circuit 707 to the foreign particle detection/correction unit 712 for each line (i.e., each main scanning line) after a delay of a first time period. The output delay circuit 711 sends the data G from the shading correction circuit 708 to the foreign particle detection/correction unit 712 for each line after a delay of a second time period. Here, the first time period is the period of time required for eight lines of original document image to be read, while the second time period is the period of time required for four lines of original document image to be read.

The first time period is equivalent to the time needed to read eight lines and the second time period is equivalent of the time needed to read four lines in order to permit simultaneous input of the R, G and B data for the same pixel of the original document to the foreign particle detection/correction unit 712. In other words, when the position B of the original document reading area 501 is deemed the reference position, the position G and the position R are located upstream in terms of the direction of original document conveyance and distanced from the position B by a four-line distance and an eight-line distance, respectively, in the secondary scanning direction. Therefore, focusing on one position (i.e., one line) on the original document, the reading of R data at the position R takes place earlier than the reading of B data at the position B by the first time period (equivalent to the time to read eight lines), and the reading of G data at the position G takes place earlier than the reading of B data at the position B by the second time period (equivalent to the time to read four lines). As a result, if the data R and the data G are delayed by the first time period and the second time period, respectively, the R, G and B data for the same line is input to the foreign particle detection/correction unit 712 at the same time.

The foreign particle detection/correction unit 712 stores the received data R, G and B in the storage area of its internal memory 7121 and detects for each pixel whether or not the pixel data R, G and B (referred to below as simply 'pixel data') is affected by foreign particles such as dust adhering to the platen glass 50.

Where a pixel affected by a foreign particle is detected, the foreign particle detection/correction unit 712 performs processing to remove the impact of such foreign particle and sends the post-correction data to the color correction unit 713. Specifically, the foreign particle detection/correction unit 712 executes processing to replace the pixel data for the pixel affected by a foreign particle with the pixel data for an adjacent pixel, for example.

The color correction unit 713 performs public-domain processing, such as black generation (BP) and undercolor removal (UCR), to the pixel data from the foreign particle/correction unit 712, converts the data into density data of the reproduction colors, i.e., cyan, magenta, yellow and black, and stores the post-conversion data in the image memory 773.

Returning to FIG. 4, when a retrieval request is received with an address instruction from the CPU 771, the image memory 773 sends the data for the various reproduction colors stored in that address to the LD driving unit 774, which executes modulation driving of the laser diode 78 based on this data.

The CPU 771 controls the operations of the various components such as the image reader 12 and printer 14 based on control programs in the ROM 775 to ensure smooth copying. It also receives key input by the operator via the operation panel 120 and causes necessary messages or the like to be displayed on the liquid crystal display.

The CPU 771 then controls the rotation of the motor 55 of the glass driving unit 51 to move the glass holder 52 (the platen glass 50) from the home position shown in FIG. 2 in the arrow E direction at a prescribed speed (⅛ of the original document conveyance speed V here) during the reading of each original document page, and to move the glass holder 52 (the platen glass 50) in the arrow D direction at a prescribed speed (approximately the same speed as the original document conveyance speed V here) to return it to the home position when reading is finished. The determination as to whether or not the platen glass 50 has returned to the home position is made via the receipt of a detection signal from the home sensor 60.

Figure 6:
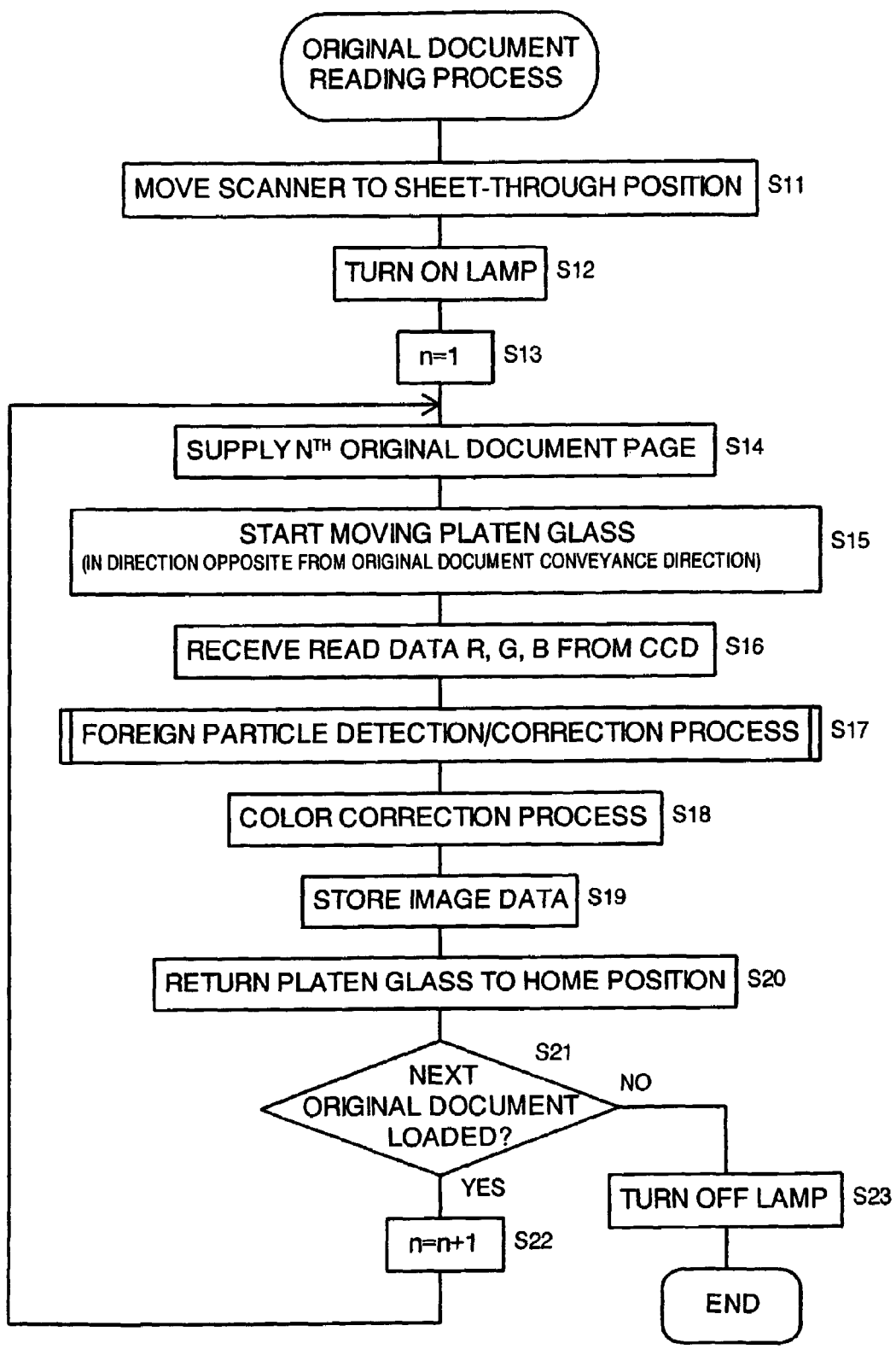
FIG. 6 is a flow chart showing the sequence of operations of an original document reading process.

FIG. 6 is a flow chart showing the sequence of operations of the original document reading process executed by the controller 77. This original document reading process is executed when the start key of the operation panel 120 is pressed by the operator with an original document loaded in the original document supply tray 18.

As shown in the drawing, the controller 77 moves the scanner 38 to the sheet-through position (step S11), and turns ON the lamp 40 of the scanner 38 (step S12). It then sets the value of the variable 'n' to '1' (step S13) and causes the $n^{th}$ page of the original document—the first or top page here—to be supplied from the original document supply tray 18 (step S14).

Just before the top edge of the supplied original document page reaches the original document reading area 501, movement of the platen glass 50 in the direction opposite the direction of original document conveyance is commenced (step S15). Specifically, the time that elapses since the top edge of the original document page passes the resist roller 30 using a detection sensor (not shown) disposed around such roller is measured, and when such time reaches a prescribed value (which is the time period required for the top edge of the original document page to reach the area immediately before the original document reading area 501), movement of the platen glass 50 is commenced.

The CCD sensor 49 is then driven at the same time that the top edge of the original document page reaches the original document reading area 501. The controller 77 receives data R, G and B read by the CCD sensor 49 for each main scanning line and sequentially stores the received data R, G and B in the internal memory 7121 of the image processor 772 on a pixel-by-pixel basis (step S16).

FIG. 7 shows in a schematic fashion the passage of the original document page over the original document reading area 501 and the movement of the platen glass 50 in the direction opposite the direction of original document conveyance.

Figure 7A:
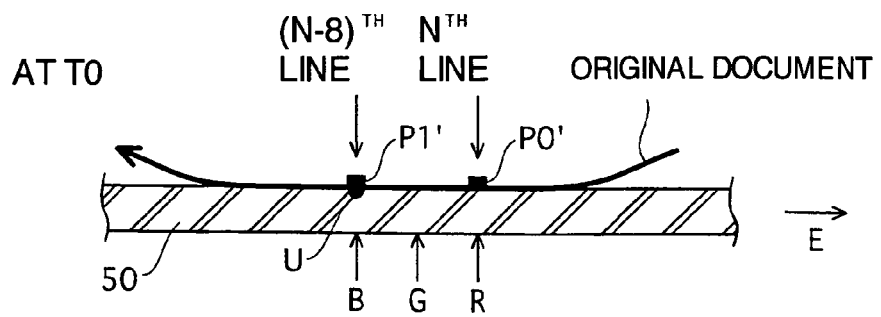
FIGS. 7(a)-7(e) are drawings showing in a schematic fashion an original document passing over the original document reading area 501 as well as the platen glass 50 moving in a direction opposite the direction of original document conveyance.

FIG. 7(a) shows the $N^{th}$ main scanning line ('the $N^{th}$ line') (when the main scanning lines are counted as the first, second . . . along the secondary scanning direction) of the original document image positioned at the position R at a certain point in time (here, T0). P0' in the drawing shows the image part for the pixel P0 that is the $m^{th}$ pixel of the $N^{th}$ line of the original document along the main scanning direction. P1' is the image part for the pixel P1 that is the $m^{th}$ pixel of the $(N-8)^{th}$ line of the original document along the main scanning direction.

U is a foreign particle (of a size equivalent to one pixel) adhering to the same position on the platen glass 50 as the image part P0' along the main scanning direction. The drawing shows that the foreign particle U is positioned at the reading position B.

For convenience of explanation, the time points at which the original document page has been conveyed by a distance equivalent to one line along the secondary scanning direction will be expressed as T1, T2 . . . , starting from T0 shown in the drawing. In addition, 'pixel' means the $m^{th}$ pixel in the main scanning direction unless defined otherwise.

Figure 7B:
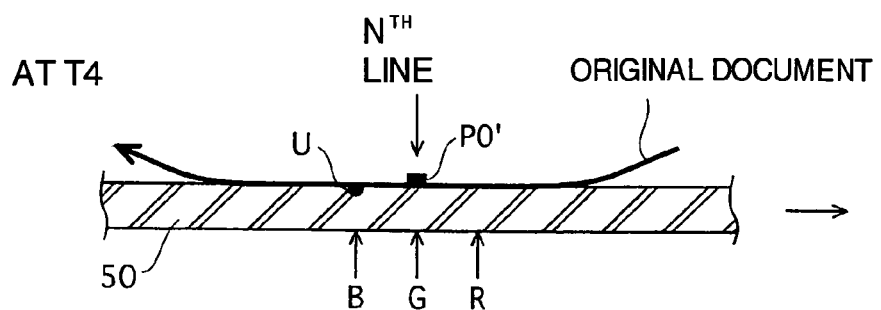

FIG. 7(b) shows the image part P0' after it has moved to the position G, i.e., the image part P0' at T4 after it has moved from T0 by a four-line distance. Because the platen glass 50 (the foreign particle U) moves at ⅛ of the original document conveyance speed V, it has moved a ⁴⁄₈-line distance from the position B toward the position G.

Figure 7C:
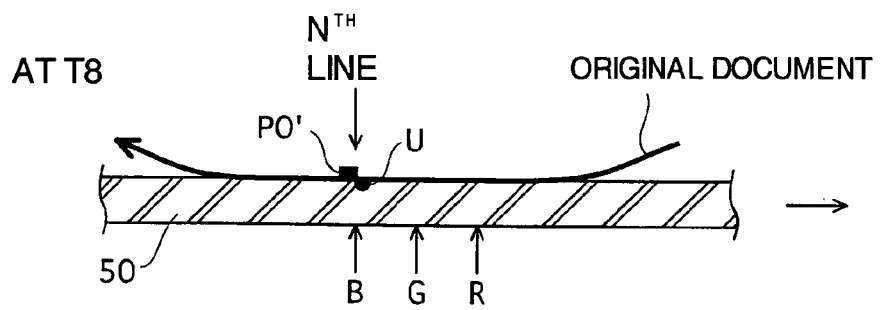

FIG. 7(c) shows the image part P0' after it has moved to the position B, or when the original document page has moved from T0 by an eight-line distance. In other words, it shows the image part P0' at T8. At this point in time, the foreign particle U has moved a one-line distance toward the position G from the position B.

Figure 7D:
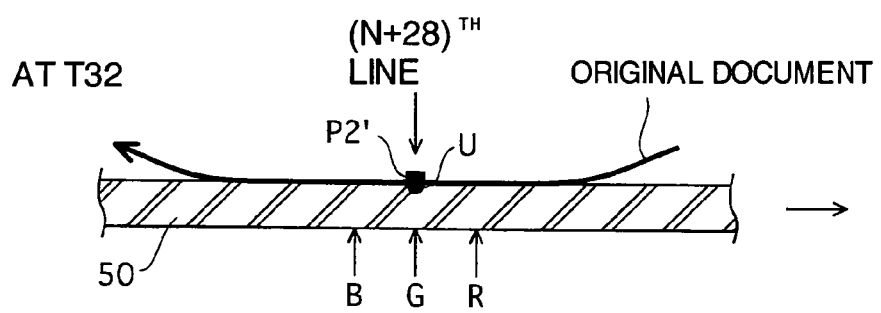

FIG. 7(d) shows the foreign particle U after it has moved to the position G. At this point in time, the foreign particle U has moved a four-line distance in the direction opposite the direction of original document conveyance from the position B. In other words, the drawing shows the foreign particle U at T32.

At this point in time, the image part P2' for the pixel P2 of the (N+28)$^{th}$ line of the original document image has moved to the position G.

Figure 7E:
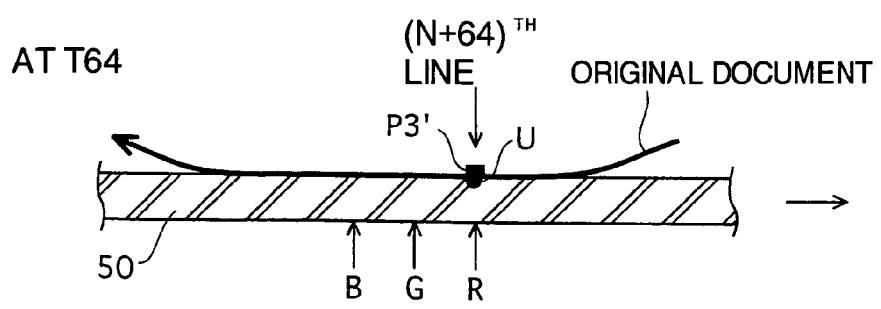

Finally, FIG. 7(e) shows the foreign particle U after it has moved to the position R. At this point in time, the foreign particle U has moved an eight-line distance in the direction opposite the direction of original document conveyance from the position B. In other words, the drawing shows the foreign particle U at T64. At this point in time, the image particle P3' for the pixel P3 of the (N+64)$^{th}$ line of the original document image has moved to the position R.

FIG. 8 shows the movement of the original document page shown in FIGS. 7(a)-7(e) along the time line.

Based on both FIGS. 7 and 8, because the image part P0' is read without interruption by the foreign particle U (i.e., without being affected by the foreign particle U) at any of the positions R, G or B, the data R, G and B, for the pixel P0 does not include color components (i.e., noise components) for the foreign particle U.

Because the image particle P1' passes over the foreign particle U at the position B at T0, it is read together with the foreign particle U and its data B becomes affected thereby. However, the data G, R for the same pixel is not affected by the foreign particle U because the image part P1' does not pass over the foreign particle U at the positions R or G since the original document page and the foreign particle U move in opposite directions.

Similarly, because the image part P2' passes over the foreign particle U at the position G at T32, only its data G becomes affected by the foreign particle U. In addition, because the image part P3' passes over the foreign particle U at the position R at T64, only its data R becomes affected by the foreign particle U.

Figure 9:
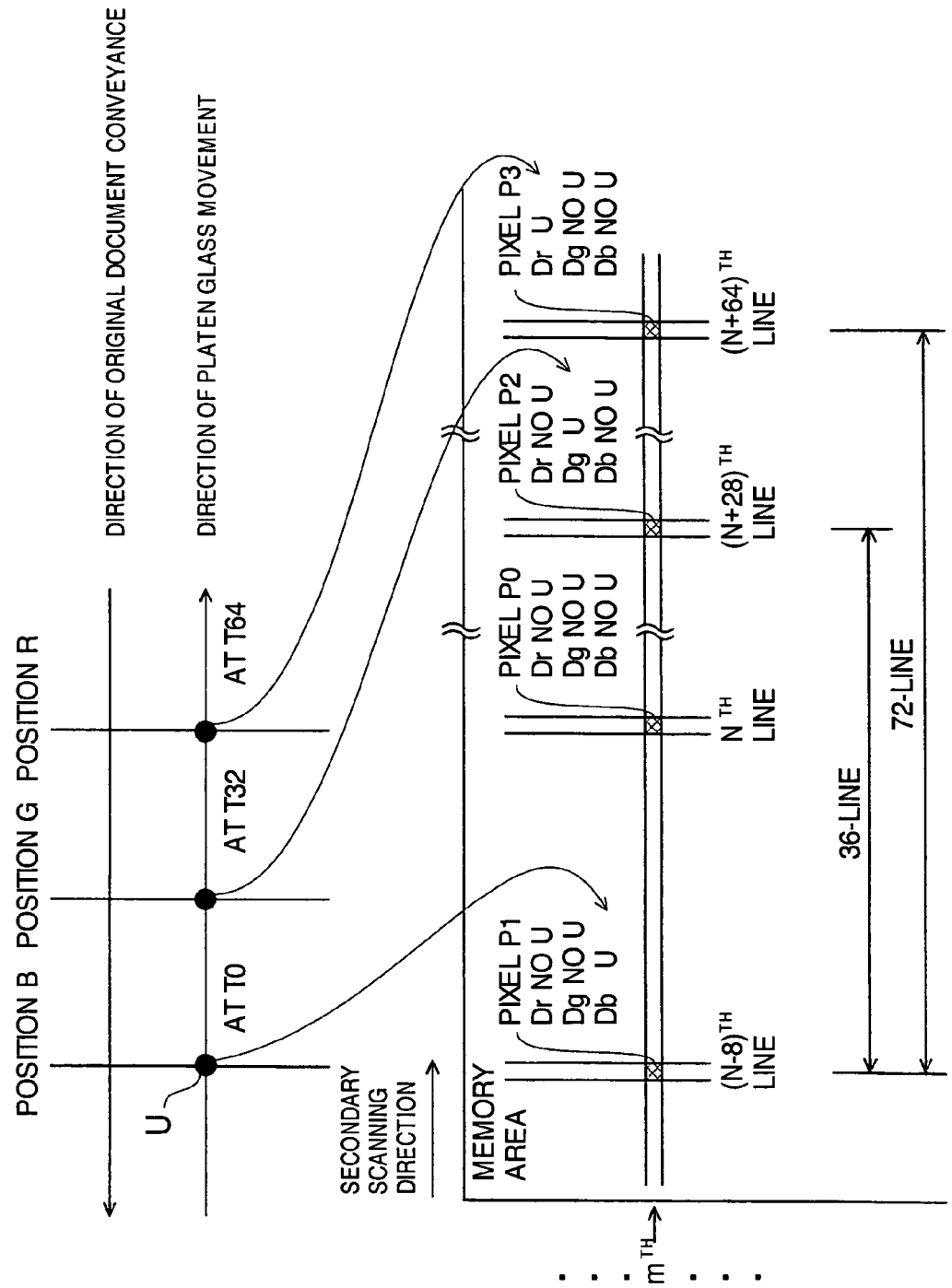
FIG. 9 is a drawing schematically showing pixel data R, G and B stored in the internal memory 7121 of the image processor 772.

FIG. 9 shows in a schematic fashion which color component data, of the data R, G and B for each pixel stored in the internal memory 7121 of the image processor 772, is affected by the foreign particle U with regard to the data for the pixels P0-P3.

In the drawing, 'Dr' refers to the data R for the R component, 'Dg' refers to the data G for the G component and 'Db' refers to the data B for the B component. 'No U' means not affected by the foreign particle, while 'U' means affected by the foreign particle.

Because the directions and speeds of movement of the original document page and the platen glass 50 are constant during the reading of the original document image, as shown in the drawing, when focusing on the three pixels P1, P2 and P3, which are separated from each other along the secondary direction by a prescribed distance (a 36-line distance here), only one color component R, G or B for each pixel is affected by the foreign particle U, and the affected color component appears in the same sequence as the sequence of reading of the color components of the foreign particle U, i.e., the sequence of the colors corresponding to each reading position along the direction of movement of the platen glass 50. Namely, the affected color components appear in the sequence of B, G and R (i.e., B is the affected color component for the pixel P1, G is the affected color component for the pixel P2, and R is the affected color component for the pixel P3.)

In this embodiment, a method is adopted in which the determination of whether or not each pixel is affected by a foreign particle U is made based on such an appearance pattern of foreign particle impact.

Returning to FIG. 6, the controller 77 executes the foreign particle detection/correction process in step S17. After the data subjected to the foreign particle detection/correction process is chromatically corrected, the controller 77 generates density data for the reproduction colors of cyan, magenta, yellow and black for the image for the first original document page (step S18) and stores this data in the image memory 773 (step S19).

When reading of the image for the first original document page is finished, the operation to return the platen glass 50 to the home position is executed (step S20). Specifically, the time elapsed since the tail edge of the first original document page passed the resist roller 30 is measured by the detection sensor, and when such time reaches a prescribed value (i.e., the time period required for the tail edge of the original document page to pass the original document reading area 501), the operation to return the platen glass 50 to the home position is begun.

It is then determined whether or not an original document is loaded in the original document supply tray 18 (step S21). If it is determined that an original document to be read is loaded therein ('YES' in step S21), '1' is added to the current value of the variable 'n' (step S22), and the controller 77 returns to step S14. Here the value of 'n' becomes 2 and the operations of steps S14-S22 comprising supply, image reading, etc. are executed regarding the second original document page. The operations of steps S14-S22 are repeated until all of the pages of the original document in the original document supply tray 18 are read, and when it is determined that there are no more original document pages to be read ('NO' in step S21), the controller 77 turns OFF the lamp 40 (step S23) and ends the process.

Figure 10:
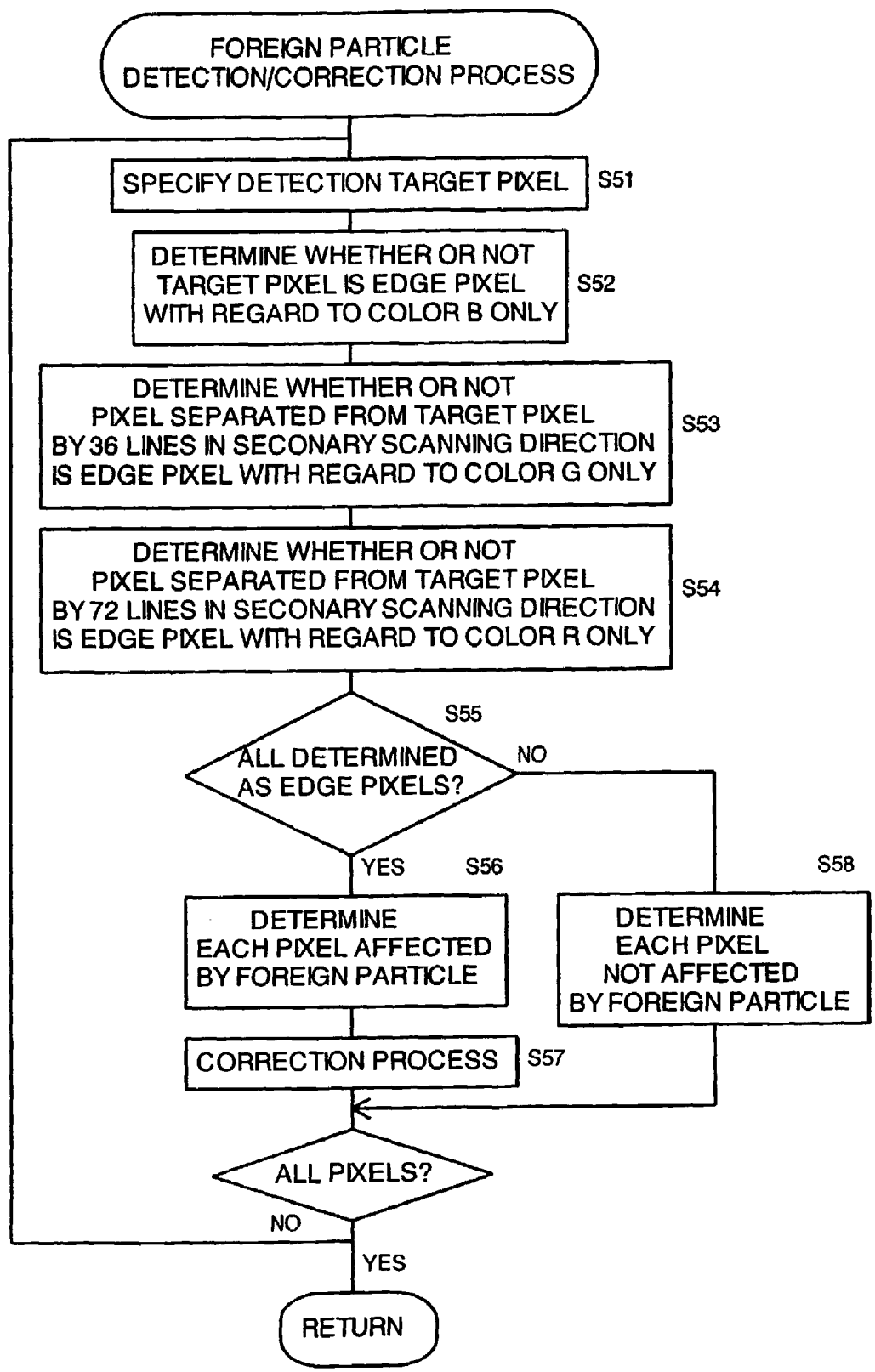
FIG. 10 is a flow chart showing the sequence of operations of a foreign particle detection/correction process subroutine.

FIG. 10 is a flow chart showing the sequence of operations of the foreign particle detection/correction subroutine executed in step S17. This process is executed by the foreign particle detection/correction unit 712 of the image processor 772.

As shown in the drawing, the foreign particle detection/correction unit 712 first specifies one pixel from among all pixels of the image of the original document page as the detection target pixel (step S51). This method of specification may be a method in which a pixel is specified according to the sequence of alignment along the main scanning direction or the secondary scanning direction, for example.

It is then determined whether or not the specified pixel (i.e., the 'target pixel', as to which the pixel P1 shown in FIG. 9 is used as an example in the description below) is an edge pixel (step S52).

Specifically, it is determined whether or not the pixel P1 is a pixel located at an edge ('an edge pixel') using only the read values Dr for the R component (i.e., the data R) of the nine pixels including the pixel P1, i.e., the pixel P1 and its surrounding pixels (comprising eight pixels, for example). The determination as to whether or not the target pixel is an edge pixel can be made based on whether or not an edge is detected using a public-domain differential filter.

It is then determined using only the read values Dg (i.e., the G component) for each pixel whether or not the pixel P1 is an edge pixel. It is then determined using only the read values Db (i.e., the B component) for each pixel whether or not the pixel P1 is an edge pixel. Determination is then made as to whether or not the result of edge pixel determination was YES only for the B component (color B).

Subsequently, using as a reference pixel the pixel at the position separated from the pixel P1 by a prescribed distance (a 36-line distance) along the secondary scanning direction, it is determined whether or not the reference pixel—here, the pixel P2—is an edge pixel (step S53).

This determination is made in the same manner as for the pixel P1. In other words, it is determined whether or not the pixel P2 is an edge pixel using only the read values Dr (the R component), only the read values Dg (the G component) and only the read values Db (the B component) of the nine pixels comprising the pixel P2 and its surrounding pixels (comprising eight pixels, for example). It is then determined whether or not the result of edge pixel determination was YES only for the G component (the color G).

Subsequently, using as a reference pixel the pixel at the position separated from the pixel P1 by a prescribed distance (a 72-line distance) along the secondary scanning direction, it is determined whether or not the reference pixel—here, the pixel P3—is an edge pixel (step S54). This determination is also made in the same manner as for the pixel P1. In other words, it is determined whether or not the pixel P3 is an edge pixel using only the read values Dr (the R component), only the read values Dg (the G component) and only the read values Db (the B component) of the nine pixels comprising the pixel P3 and its surrounding pixels (comprising eight pixels, for example). It is then determined whether or not the result of edge pixel determination was YES only for the R component (the color R).

Where it is determined that the pixel P1 was an edge pixel with regard to only the B color, the pixel P2 was an edge pixel with regard only the G color and the pixel P3 was an edge pixel with regard to only the R color (hereinafter also 'where the first condition is met') ('YES' in step S55), it is determined that it is likely that the pixels P1-P3 are affected by a foreign particle U (step S56). Conversely, where it is determined that the first condition is not met ('NO' in step S56), the foreign particle detection/correction unit 712 proceeds to step S58 and determines that it is likely that the pixels P1-P3 are not affected by a foreign particle U.

It is determined that the pixel images are affected by a foreign particle U only when the first condition is met as described above, for the following reasons.

As explained with reference to FIG. 9, in this embodiment, due to the construction in which the original document and the platen glass 50 move at constant speeds in opposite directions from each other, when one focuses on the three pixels P1, P2 and P3 that are distanced from each other by a prescribed distance (a 36-line distance here) along the secondary scanning direction, the impact of one foreign particle U appears only in the color B for the pixel P1, only in the color G for the pixel P2, and only in the color R for the pixel P3.

For example, where the pixel P1 is a pixel for a light image part of the original document image and the foreign particle U (high density) component is included in the read value Db for such pixel (the foreign particle component is not included in the read values for the surrounding pixels), it is likely that the read value for the color B for the pixel P1 indicates a high density while the read values for the surrounding pixels indicate a low density, resulting in a large difference between the pixel P1 and the surrounding pixels, and therefore a high likelihood of detection that the pixel P1 is an edge pixel. At the same time, because the foreign particle U component is not included with regard to the colors R and G, the read values for the pixel P1 as well as for the surrounding pixels indicate a low density, resulting in a small difference between the pixel P1 and the surrounding pixels and therefore a low likelihood of detection that the pixel P1 is an edge pixel.

Conversely, where the pixel P1 is not affected by a foreign particle U, all of the read values for the pixel P1 and the surrounding pixels should indicate a low density with regard to all color components of R, G and B, resulting in a small difference between the pixel P1 and the surrounding pixels and therefore a low likelihood of detection that the pixel P1 is an edge pixel. Accordingly, where the pixel P1 is affected by a foreign particle U, it is likely to be determined to be an edge pixel only with regard to the color B.

This principle also applies to the pixels P2 and P3. For example, where the foreign particle U (high density) component is included in the read value Dg for the pixel P2, it is likely that the read value for the color G for the pixel P2 will indicate a high density while the read values for the surrounding pixels will indicate a low density, resulting in a large difference between the pixel P2 and the surrounding pixels, and therefore a high likelihood of detection that the pixel P2 is an edge pixel. At the same time, because the foreign particle U component is not included with regard to the colors B or R, the read values for the pixel P2 as well as for the surrounding pixels indicate a low density, resulting in a small difference between the pixel P2 and the surrounding pixels, and therefore a low likelihood of detection that the pixel P2 is an edge pixel. Conversely, where the pixel P2 is not affected by a foreign particle U, all of the read values for the pixel P2 and the surrounding pixels indicate a low density with regard to all color components of R, G and B, resulting in a small difference between the pixel P2 and the surrounding pixels, and therefore a low likelihood of detection that the pixel P2 is an edge pixel. Accordingly, where the pixel P2 is affected by a foreign particle U, it is likely to be determined to be an edge pixel only with regard to the color G.

Conversely, the fact that when a foreign particle U is read, the B component, the G component and the R component thereof are distributed to the read value Db for the pixel P1, the read value Dg for the pixel P2 and the read value Dr for the pixel P3 means that where the color components of a foreign particle U appear in such a pattern, it is very likely that the read value for the color B for the pixel P1, the read value for the color G for the pixel P2 and the read value for the color R for the pixel P3 will include the foreign particle U components. Therefore, in this embodiment, it is determined to be likely that the pixels P1-P3 are affected by a foreign particle U when the first condition is met.

In step S57, an operation to correct the read values for pixels determined to be affected by a foreign particle U is executed. Specifically, because it is likely that the read value Db for the pixel P1, the read value Dg for the pixel P2 and the read value Dr for the pixel P3 will include the color components of the foreign particle U, each of these read values is replaced with the read value for one of the surrounding pixels regarding the same color. The method of this correction is not limited to this method. Any of the various other public-domain methods can be used, including a method to correct the foreign particle-affected read value for the specified pixel via interpolation using the read values for the specified pixel and the surrounding pixels, as well as a smoothing method using a smoothing filter.

In step S59, it is determined whether or not the foreign particle detection process comprising steps S51-58 has been executed for all pixels.

Where it is determined that the foreign particle detection/correction process has not been executed for all pixels ('NO' in step S59), the foreign particle detection/correction unit 712 returns to step S51, another pixel is specified as the detection target pixel, and the processing to determine whether or not the target pixel is affected by a foreign particle is performed. The operations of steps S51-S58 are repeatedly executed until it is determined in step S59 that the foreign particle detection/correction process has been executed for all pixels, and where it is determined that such process has been completed for all pixels ('YES' in step S59), the foreign particle detection/correction unit 712 returns to the main routine.

An example in which one foreign particle U was adhering to the platen glass 50 was explained above, but even when multiple foreign particles are adhering to all of the positions R, G and B, the color components of each foreign particle are distributed to different combination of pixels (P1, P2, P3) due to the movement of the platen glass 50. As a result, each foreign particle can be individually detected as in the same manner as where there is only one foreign particle.

As described above, in this embodiment, even if a foreign particle is adhering to the platen glass 50, the foreign particle does not stay at one reading position (R, G, or B position) due to the movement of the original document and the platen in opposite directions from each other and the R, G and B color components of the foreign particle are distributed to three pixels P1, P2 and P3, which are distanced from each other by a prescribed distance along the secondary scanning direction, such that only one color component of the foreign particle is included in the read value for the same color for each pixel, and the color components of the foreign particle (noise components) can be detected based on the pattern of appearance of the color components of the foreign particle.

Therefore, the problem that a foreign particle adhering to the platen glass makes it impossible to detect the foreign particle due to the construction of the conventional art in which the platen glass does not move no longer exists, and it is also not necessary to include another CCD sensor dedicated to foreign particle detection, enabling more accurate detection of noise.

Second Embodiment

In the first embodiment, the platen glass 50 was moved in the direction opposite the direction of original document conveyance, but in this embodiment, the platen glass 50 is moved in the same direction as the direction of original document conveyance. The second embodiment differs from the first embodiment in this regard. For convenience of explanation, components and functions identical to those in the first embodiment are omitted from the description and the components identical to those used in the first embodiment are assigned the same numbers.

Figure 11:
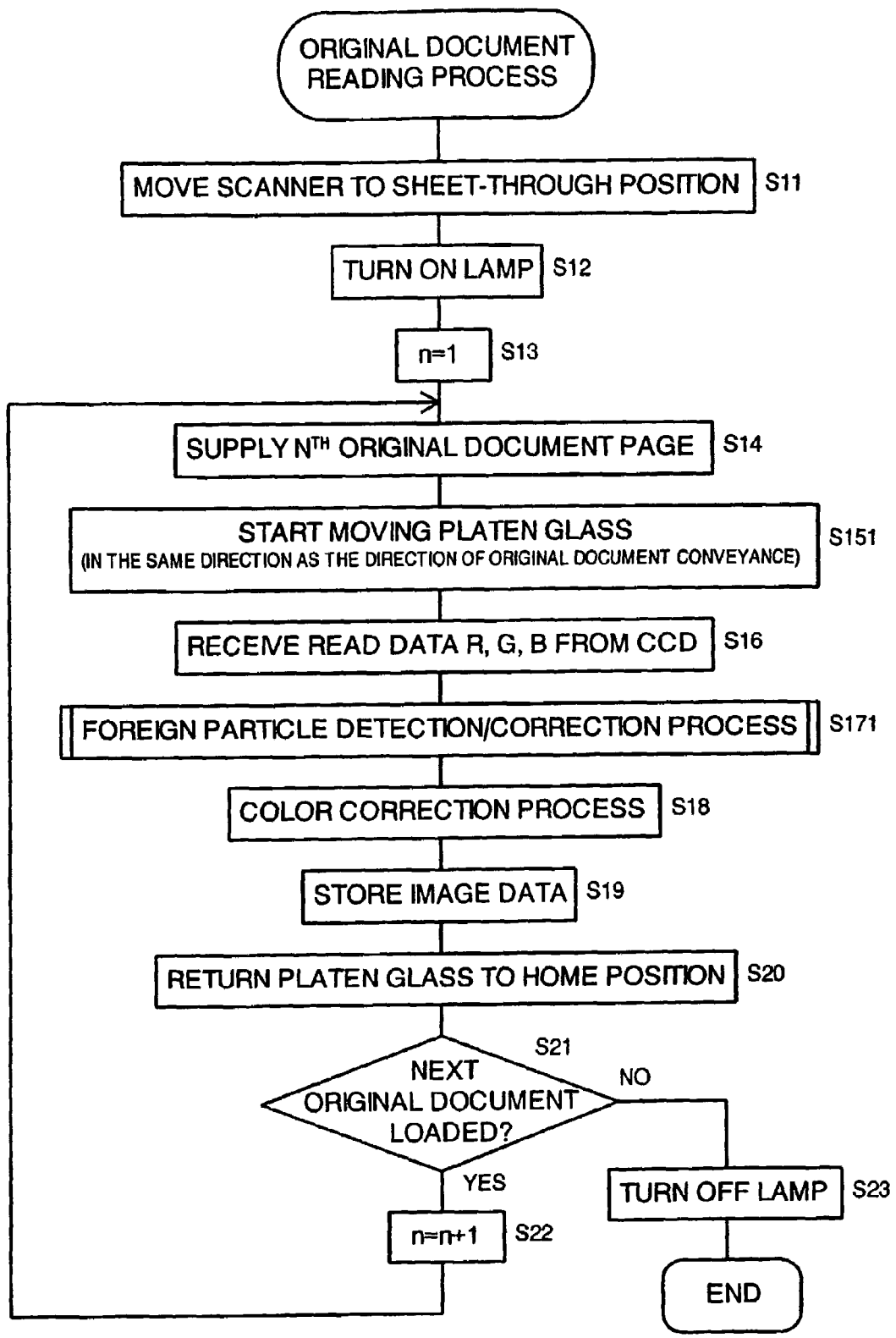
FIG. 11 is a flow chart showing the sequence of operations of the original document reading process of a second embodiment.

FIG. 11 is a flow chart showing the sequence of operations of the original document reading process of this embodiment.

As shown in the drawing, the original document reading process is different from that of the first embodiment with regard to steps S151 and S171.

Step S151 is an operation to begin the movement of the platen glass 50 in the same direction as the direction of original document conveyance. The moving speed of the platen glass 50 is approximately ⅛ of the original document conveyance speed V, as in the first embodiment.

Figure 12A:
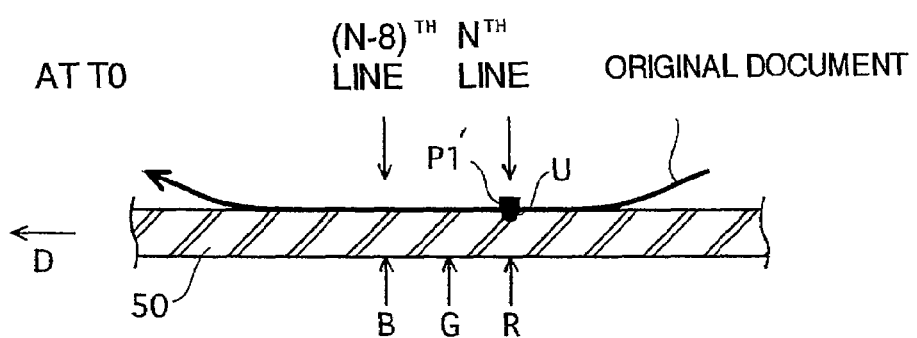
FIGS. 12(a)-12(c) are drawings showing in a schematic fashion an original document passing over the original document reading area 501, as well as the platen glass 50 moving in the same direction as the direction of original document conveyance.
Figure 12B:
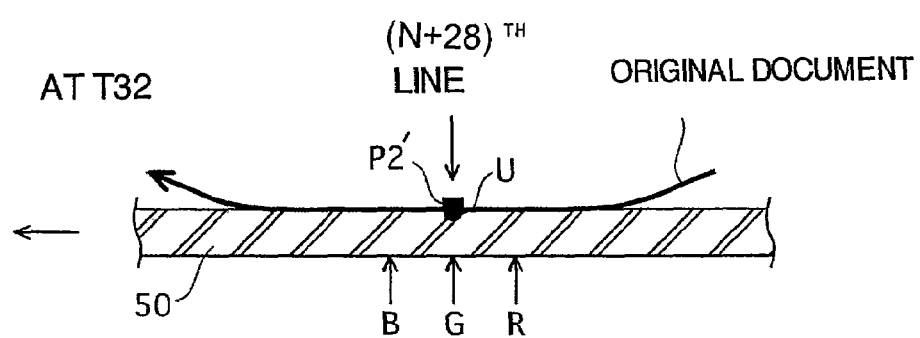
Figure 12C:
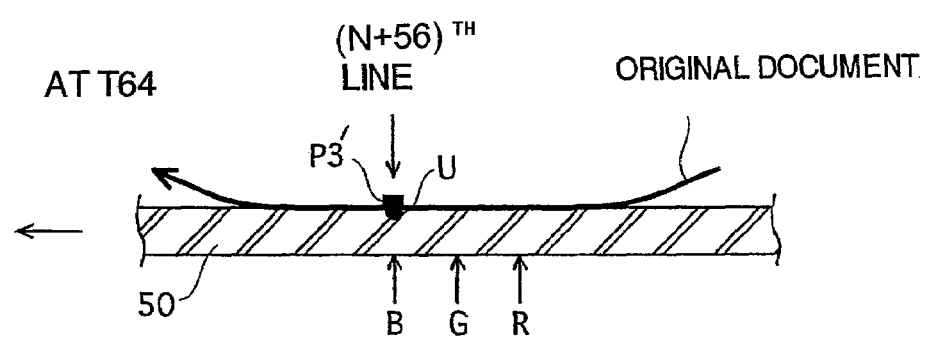

FIG. 12 shows in a schematic fashion the passage of an original document page over the original document reading area 501 and the platen glass 50 moving in the same direction as the direction of original document conveyance (the arrow D direction).

FIG. 12(*a*) shows an image part P1' of the $N^{th}$ line of the original document image positioned at the position R, as well as a foreign particle U adhering to the platen glass 50 at the position R.

FIG. 12(*b*) shows the foreign particle U after it has moved to the position G. It shows the foreign particle U after it has moved from the position R by a four-line distance in the same direction as the direction of original document conveyance or, in other words, the foreign particle U at T32. At this point in time, an image part P2' of the $(N+28)^{th}$ line of the original document image has moved to the position G.

FIG. 12(*c*) shows the foreign particle U after it has moved to the position B. It shows the foreign particle U after it has moved from the position R by an eight-line distance in the same direction as the direction of original document conveyance or, in other words, the foreign particle U at T64. At this point in time, an image part P3' of the $(N+56)^{th}$ line of the original document image has moved to the position B.

Figure 13:
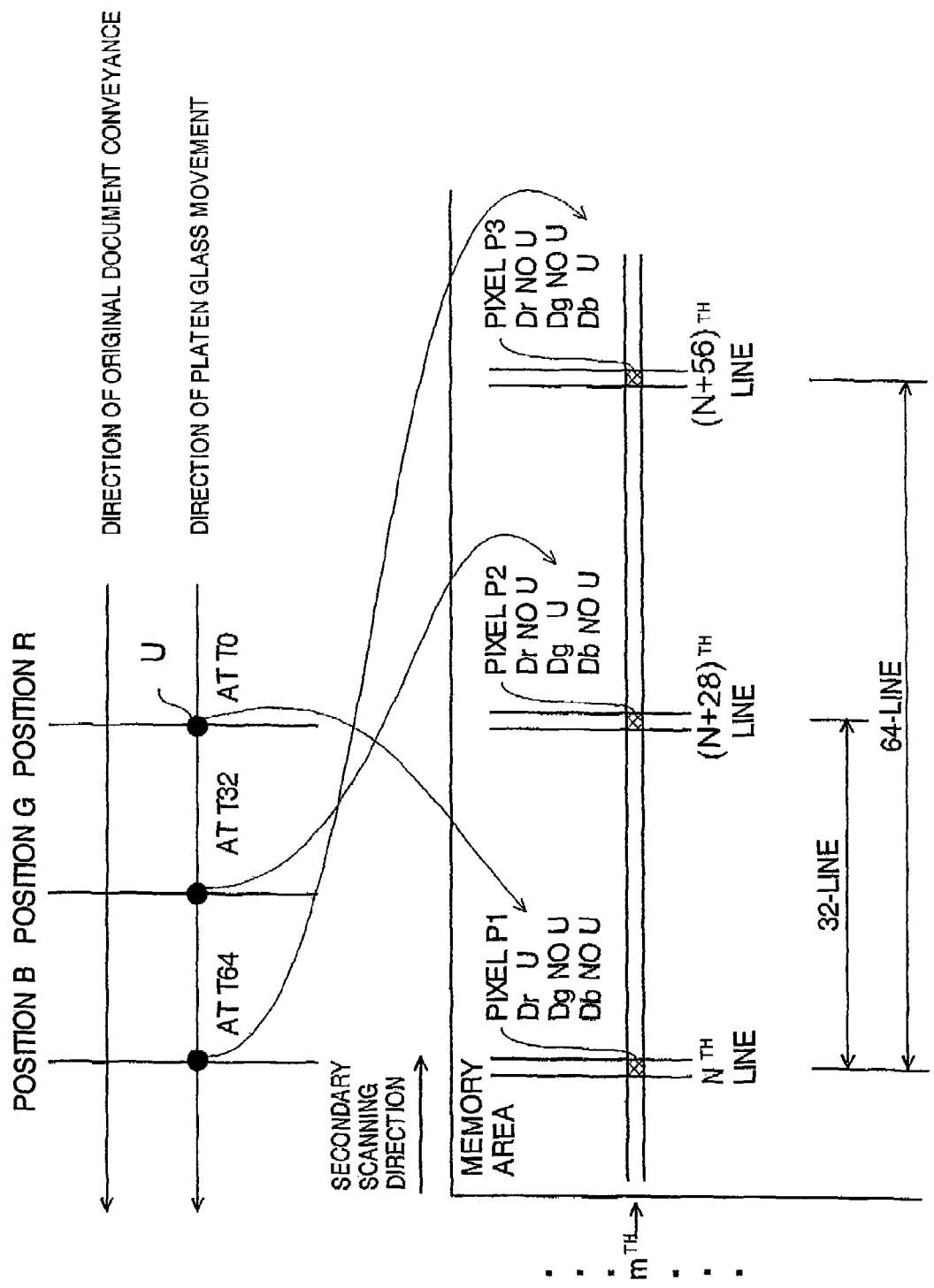
FIG. 13 is a drawing showing in a schematic fashion pixel data R, G and B stored in the internal memory 7121 of the image processor 772 in the second embodiment.

FIG. 13 schematically shows which of the read values Dr, Dg and Db among the pixel data stored in the internal memory 7121 of the image processor 772 is affected by the foreign particle U with regard to the pixels P1-P3.

As shown in the drawing, focusing on the three pixels P1, P2 and P3 that are separated from each other by a prescribed distance (a 28 line distance here) along the secondary scanning direction, only one of the color component data Dr, Dg and Db for each pixel is affected by the foreign particle U, and the affected color components appear in the sequence of the reading of the foreign particle (i.e., R, G, B).

Namely, the impact of the foreign particle U appears in the R component for the pixel P1 followed by the G component for the pixel P2 and the B component for the pixel P3. In the first embodiment, because the foreign particle U was read in the sequence of B, G, R, the affected color component also appeared in the sequence of B, G, R. The appearance pattern of the impact of the foreign particle U is thus reversed in the second embodiment.

Figure 14:
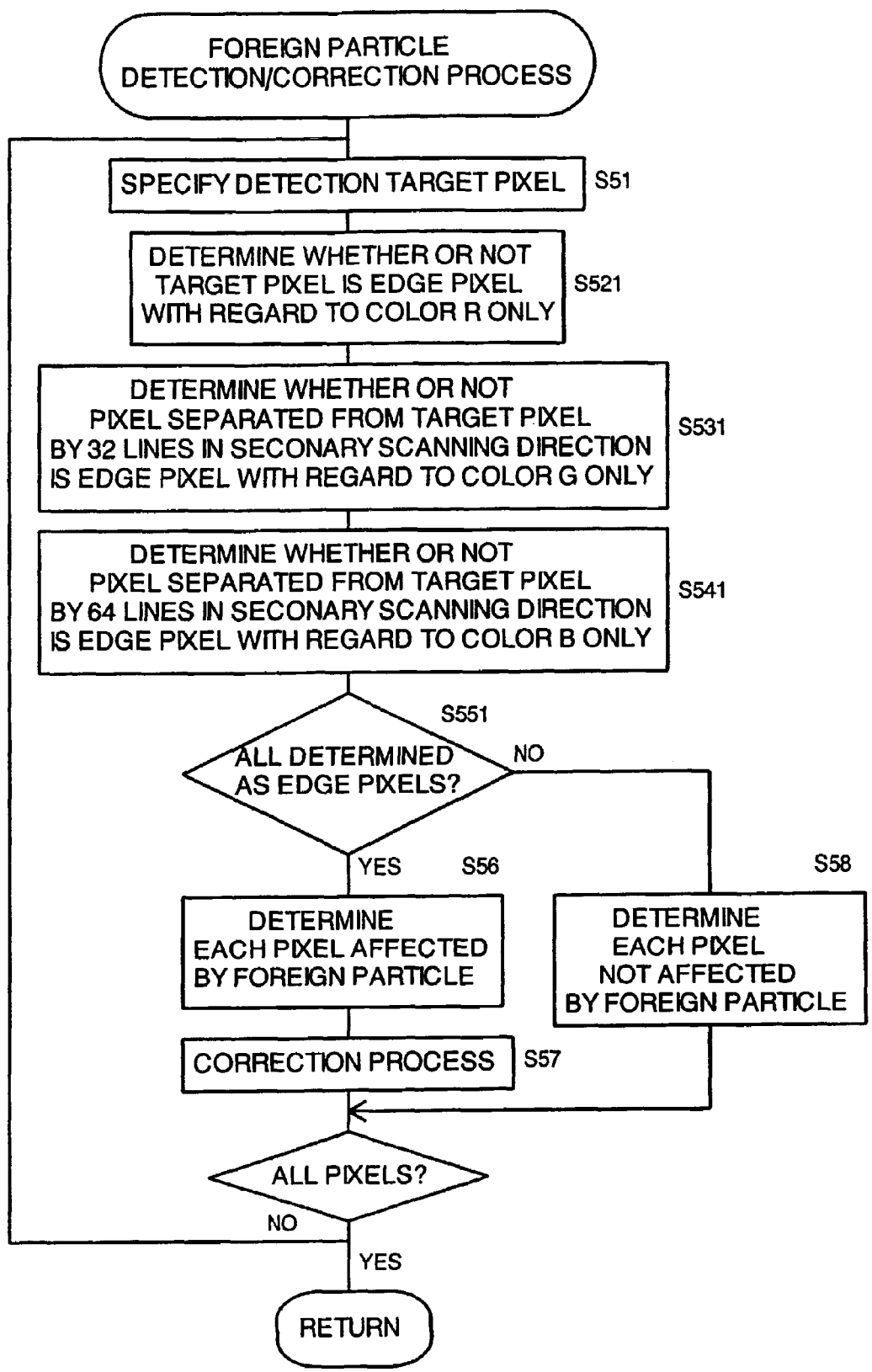
FIG. 14 is a flow chart showing the sequence of operations of the foreign particle detection/correction process subroutine of the second embodiment.

FIG. 14 is a flow chart showing the sequence of operations of the foreign particle detection/correction subroutine executed in step S171.

As shown in the drawing, this foreign particle detection/correction process is different from that of the first embodiment (step S17) with regard to steps S521, S531, S541 and S551.

In step S521, it is determined whether or not the pixel P1, which comprises the target pixel, was determined to be an edge pixel only in connection with the color R, because in the construction in which the platen glass 50 moves in the same direction as the direction of original document conveyance, the impact of a foreign particle U is likely to appear only in connection with the color R for the pixel P1, as shown in FIG. 13. In the first embodiment, it was determined whether or not edge determination was YES only with regard to the color B. This embodiment is different from the first embodiment in this regard.

In step S531, it is determined whether or not the result of edge pixel determination was YES only in connection with the color G for the pixel P2, which is separated from the pixel P1 by a prescribed distance (a 28-line distance) along the secondary scanning direction. As far as the color G is concerned, this embodiment is the same as the first embodiment.

In step S541, it is determined whether or not edge pixel determination was YES only in connection with the color B for the pixel P3, which is separated from the pixel P1 by a prescribed distance (a 56-line distance) along the secondary scanning direction, because in the construction in which the platen glass 50 moves in the same direction as the direction of original document conveyance, the impact of the foreign particle U is likely to appear in the color B only for the pixel P3. This embodiment differs from the first embodiment in this regard.

If it is determined in step S551 that the pixel P1 is determined to be an edge pixel with regard to the color R only, the pixel P2 is determined to be an edge pixel with regard to the color G only, and the pixel P3 is determined to be an edge pixel with regard to the color B only (hereinafter 'where the second condition is met') (YES in step S551), the foreign particle detection/correction unit 712 proceeds to step S56 and determines that it is likely that the pixels P1-P3 are affected by a foreign particle. This is because in the construction in which the platen glass 50 moves in the same direction as the direction of original document conveyance, it is likely that the pixels P1, P2 and P3 are likely to be determined to edge pixels with regard to only one color R, G or B, respectively, if affected by a foreign particle.

On the other hand, where the second condition is not met (NO in step S5551), the foreign particle detection/correction unit 712 proceeds to step S58 and determines that the pixels P1-P3 are not affected by a foreign particle.

Even where the platen glass 50 is moved in the same direction as the direction of original document conveyance as described above, if the platen glass 50 moves while sliding along the original document (i.e., if the platen glass 50 is moved at a different speed than the original document conveyance speed V), the R, G and B components of a foreign particle U can be distributed to three pixels P1, P2 and P3 in the same manner as when the two components are moved in opposite directions from each other, enabling detection of foreign particles.

Although the present invention has been fully described in connection with the preferred embodiments thereof with reference to the accompanying drawings, it is to be noted that various changes and modification are apparent to those skilled in the art. Such changes and modifications are to be understood as included within the scope of the present invention as defined by the appended claims unless they depart therefrom.

The present invention is not limited to an image reading device, and can comprise a method to execute the reading process described above or a program that executes the method on a computer. The program pertaining to the present invention can be recorded on any of various computer-readable recording media including a magnetic tape, a magnetic disk such as a flexible disk, an optical recording medium such as a DVD-ROM, a DVD-RAM, a CD-ROM, a CD-R, an MO, a PD or a BD (Blue-ray Disk), or a flash memory recording medium such as Smart Media®, and may be produced and transferred in the form of a recording on a recording medium, or may be transmitted and provided as in the form of a program via any of various hard-wired and wireless networks including the Internet, broadcasting, electronic communication circuits and satellite communication.

The program pertaining to the present invention need not include all modules by which to execute the processes described above on a computer. The various processes of the present invention may be executed on a computer using any of various generic programs that can be separately installed in information processors, such as communication programs and programs included in the operating system (OS), for example. Accordingly, the recording medium pertaining to the present invention need not have all of the above modules recorded thereon, nor must all such modules be transmitted. Furthermore, prescribed processes may be executed using dedicated hardware.

(Modifications)

The present invention was described above with reference to embodiments, but the present invention is naturally not limited to such embodiments, and may be implemented using the following modified versions.

(1) In the first embodiment described above, the platen glass 50 was moved at ⅛ of the speed of the original document conveyance in the direction opposite the direction of original document conveyance, but the moving speed of the platen glass 50 is not limited thereto. For example, the platen glass 50 may be moved more rapidly. If the platen glass 50 is moved more rapidly, the foreign particle U passes the reading area (comprising the positions B, G and R) more quickly, and therefore the number of pixels that are affected thereby may be reduced.

In addition, in terms of the accuracy of detection of foreign particles U, it is preferred that the platen glass 50 be moved more rapidly for the following reasons. If one foreign particle is of such a size that it covers both the positions G and B (e.g., a size equivalent to six pixels), if the moving speed of the platen glass 50 is very slow, the foreign particle passes the reading area (comprising the positions R, G and B) slowly. As a result, when an image part of the original document (e.g., P1') moves in the sequence of the position G and the position B, the foreign particle is still on both positions, and consequently the impact of the foreign particle is felt by both Dg and Gb out of the reading values Dr, Dg and Db for one pixel, preventing detection of the foreign particle.

On the other hand, if the moving speed of the platen glass 50 is increased, the foreign particle moves faster to the same extent, and when the image part P1' reaches the position B, the foreign particle has already passed the position B. As a result, it is more likely that only the color G, i.e., only a single color component value, will becomes affected by the foreign particle, enabling detection to be achieved with improved accuracy even regarding relatively large-sized foreign particles.

If one focuses on this point only, it would seem preferable to move the platen glass 50 more rapidly, but this would make it necessary to increase the secondary scanning direction length of the platen glass 50 and accordingly the distance over which the platen glass 50 moves, which would result in a larger device. In addition, where the dust, etc. that may adhere to the platen glass 50 can be presumed to be very small in size from the viewpoint of the construction of the device, even if the moving speed of the platen glass 50 is reduced somewhat (e.g., to approximately ⅒ of the original document conveyance speed), adequate detection of foreign particles may be achieved.

Therefore, the optimal platen glass moving speed should be sought empirically based on the size of foreign particles to be detected, the space available for installation of the platen glass 50 and related components, the original document conveyance speed and the like. This principle also applies when moving the platen glass 50 in the same direction as the direction of original document conveyance, as in the second embodiment.

Because the platen glass 50 moves at a constant speed, the moving speed thereof is proportional to the distance along the secondary scanning direction among the three pixels P1, P2 and P3 to which the R, G and B color components of the foreign particle are distributed. Therefore, the secondary scanning direction distance among the pixels P1, P2 and P3, as well as which pixels constitute pixels P2 and P3 relative to a target pixel P1, are determined from the moving speed of the platen glass 50 and the secondary scanning direction distance among the reading positions R, G and B.

For example, if the secondary scanning direction distance between the reading positions R and G and that between the reading positions G and B are both L, the original document conveyance speed is V and the time required for the platen glass 50 to move the distance L is T, the distance between pixels may be expressed as (V*T+L) for the construction in which the original document and the platen glass move in opposite directions from each other and (V*T−L) for the construction in which the original document and the platen glass move in the same direction.

(2) In the first (second) embodiment described above, the determination of whether or not noise components are included is made depending on whether or not the first (second) condition is met, but the method to detect noise components is not limited thereto. For example, a noise component may be determined to be included when a target pixel is determined to be an edge pixel only with regard to one of the read values Dr, Db and Dg. The determination as to whether or not a pixel is an edge pixel can be made using the same type of processing shown in connection with step S52.

This detection method is particularly effective, for example, where the target pixel, which is in the background (such as white) of the original document, is affected by a high density (e.g., black) foreign particle adhering to the platen glass 50, and only one color component, e.g., the color B component, included the corresponding color component of the foreign particle (i.e., only the read value Db was a value indicating a high density). Because the read values Dr, Db and Dg for the target pixel and those for the surrounding pixels should similarly indicate the density of the background if not affected by the foreign particle, when only the read value Db indicates a high density and the edge pixel determination is YES with regard to this color component only, it is determined that it is likely that a noise component is included in the read value Db for the target value.

In this detection method, noise detection is carried out only with regard to target pixels, and in comparison with a method in which noise detection is carried out based on the read values for pixels P1-P3, as in the first embodiment, this detection method offers the advantage that the detection operations can be simplified.

(3) A method can also be adopted in which a noise component is determined to be included in the target pixel when the tone difference between the target pixel and the surrounding pixels is a prescribed value or larger. Specifically, the brightness is sought for each pixel from the read values Dr, Db and Dg and it is determined whether or not the brightness difference is a prescribed value or larger. This detection method is particularly effective when the target pixel and the surrounding pixels belong to the same color area of the original document. For example, without any impact from a foreign particle having a different color from the target pixel or the surrounding pixels, the target pixel and the surrounding pixels should have the same brightness. Therefore, if it is determined that only the target pixel has a conspicuously different brightness from the surrounding particles (i.e., the tone difference is a prescribed value or larger), it is determined that it is likely that the target pixel includes a noise component. It is also acceptable if not only brightness but also chroma saturation and color difference are include as the determination parameters, or if any one of the detection methods described above is selectively adopted or all of them are sequentially executed.

(4) An example in which the image reading device of the present invention was applied in a copier was described in connection with the above embodiments, but the present invention can be generally applied in any sheet through-type image reading device that reads color original document images, such as a scanner, a facsimile machine or an MFP (Multifunction Peripheral). In addition, a CCD sensor 49 was used as the reading unit to read the color image, but any reading unit is acceptable so long as it reads the image of the original document being conveyed at multiple reading positions that are disposed with a prescribed distance between each other along the direction of original document conveyance. A reading unit that has the function to output a different color component signal for each reading position will do. A CIS (Contact Image Sensor) may be used, for example. The colors that may be read are also not limited to the three colors of R, G and B. and may be different multiple colors. In this case, a reading position should be set for each color. Any combination of the embodiments and modified embodiments is also acceptable.

What is claimed is:

1. An image reading device comprising:
a transparent member;
a conveyance unit that conveys an original document to the transparent member;
a reading unit that reads via the transparent member an image of the original document being conveyed on the transparent member at multiple reading positions that exist with a prescribed distance therebetween along an original document conveyance direction;
an output unit that outputs signals for different color components corresponding to each of the reading positions;
a transparent member moving unit that moves the transparent member in a prescribed direction such that the original document slides over the transparent member while being conveyed to the reading positions during image reading; and
a detector that detects noise components caused by foreign particles on the transparent member based on the output signals from the output unit;
wherein said reading unit reads the image of the original document on pixel-by-pixel basis and the detector detects whether or not an edge component is included in a color component signal for each pixel and detects the existence of noise components based on the detection results;
wherein when the number of multiple positions is 'n' and the number of different colors is 'n'('n' being an integer that equals or exceeds 2), and when the color component signals for the target pixel and (n−1) reference pixels located within prescribed distances from the target pixel along the secondary scanning direction are analyzed in sequence starting with the target pixel, if the sequence of colors including an edge component matches the sequence of colors corresponding to the reading positions along the direction of movement of the transparent member, said detector determines that a noise component is included in each pixel's color component signal including an edge component.

2. The image reading device according to claim 1, wherein said reading unit reads the original document image at first, second and third reading positions and said output unit outputs a red component signal for the first reading position, a green component signal for the second reading position, and a blue component signal for third reading position.

3. An image reading device comprising:
a transparent member;
a conveyance unit that conveys an original document to the transparent member;
a reading unit that reads via the transparent member an image of the original document being conveyed on the transparent member at multiple reading positions that exist with a prescribed distance therebetween along an original document conveyance direction;
an output unit that outputs signals for different color components corresponding to each of the reading positions;
a transparent member moving unit that moves the transparent member in a prescribed direction such that the original document slides over the transparent member while being conveyed to the reading positions during image reading; and a detector that detects noise components caused by foreign particles on the transparent member based on the output signals from the output unit;

wherein the prescribed direction is a direction opposite the direction of movement of the original document on the transparent member and, when the distance between adjacent reading positions along the secondary scanning direction is L, the original document conveyance speed is V and the period of time required by the transparent member to move the distance L is T, the prescribed distance is an inter-pixel distance equivalent to the distance (V*T+L).

4. The image reading device according to claim 3, wherein said reading unit reads the original document image at first, second and third reading positions and said output unit outputs a red component signal for the first reading position, a green component signal for the second reading position, and a blue component signal for third reading position.

5. An image reading device comprising:
a transparent member;
a conveyance unit that conveys an original document to the transparent member;
a reading unit that reads via the transparent member an image of the original document being conveyed on the transparent member at multiple reading positions that exist with a prescribed distance therebetween along an original document conveyance direction;
an output unit that outputs signals for different color components corresponding to each of the reading positions;
a transparent member moving unit that moves the transparent member in a prescribed direction such that the original document slides over the transparent member while being conveyed to the reading positions during image reading; and
a detector that detects noise components caused by foreign particles on the transparent member based on the output signals from the output unit;
wherein said reading unit reads the image of the original document on pixel-by-pixel basis and the detector detects a noise component when the gradation difference between the target pixel and its surrounding pixels equals or exceeds a prescribed value for each pixel.

6. The image reading device according to claim 5, wherein said gradation difference is brightness.

7. The image reading device according to claim 5, wherein said gradation difference is chroma saturation.

8. The image reading device according to claim 5, wherein said gradation difference is color difference.

9. The image reading device according to claim 5, wherein said reading unit reads the original document image at first, second and third reading positions and said output unit outputs a red component signal for the first reading position, a green component signal for the second reading position, and a blue component signal for third reading position.

10. An image reading device comprising:
a transparent member;
a conveyance unit that conveys an original document to the transparent member;
a reading unit that reads via the transparent member an image of the original document being conveyed on the transparent member at multiple reading positions that exist with a prescribed distance therebetween along an original document conveyance direction;
an output unit that outputs signals for different color components corresponding to each of the reading positions;
a transparent member moving unit that moves the transparent member in a prescribed direction such that the original document slides over the transparent member while being conveyed to the reading positions during image reading; and
a detector that detects noise components caused by foreign particles on the transparent member based on the output signals from the output unit;
wherein the prescribed direction is the same direction as the direction of movement of the original document on the transparent member, and said transparent member moving unit moves the transparent member at a slower speed than the speed of movement of the original document.

11. The image reading device according to claim 10, wherein when the distance between adjacent reading positions along the secondary scanning direction is L, the original document conveyance speed is V and the period of time required by the transparent member to move the distance L is T, the prescribed distance is an inter-pixel distance equivalent to the distance (V*T−L).

12. The image reading device according to claim 10, wherein said reading unit reads the original document image at first, second and third reading positions and said output unit outputs a red component signal for the first reading position, a green component signal for the second reading position, and a blue component signal for third reading position.

* * * * *

UNITED STATES PATENT AND TRADEMARK OFFICE
CERTIFICATE OF CORRECTION

PATENT NO.       : 7,649,656 B2                                                Page 1 of 1
APPLICATION NO. : 11/009462
DATED            : January 19, 2010
INVENTOR(S)      : Maruchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1432 days.

Signed and Sealed this

Twenty-third Day of November, 2010

David J. Kappos
*Director of the United States Patent and Trademark Office*